(12) United States Patent
Minchew et al.

(10) Patent No.: US 10,107,687 B2
(45) Date of Patent: Oct. 23, 2018

(54) COLOR DISPLAYS BASED ON COLOR EMOTIONS AND COLOR HARMONY

(71) Applicant: Columbia Insurance Company, Omaha, NE (US)

(72) Inventors: Carl Minchew, Mountain Lakes, NJ (US); Priscilla Ghaznavi, Brooklyn, NY (US); Andrea Magno, Wayne, NJ (US); Ellen O'Neill, New York, NY (US); Hannah Yeo, Clifton, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 14/728,230

(22) Filed: Jun. 2, 2015

(65) Prior Publication Data

US 2015/0268098 A1    Sep. 24, 2015

Related U.S. Application Data

(63) Continuation-in-part of application No. 12/668,352, filed as application No. PCT/US2008/069823 on Jul. 11, 2008, now Pat. No. 9,134,179.

(60) Provisional application No. 60/929,743, filed on Jul. 11, 2007.

(51) Int. Cl.
*G09G 5/02* (2006.01)
*G01J 3/52* (2006.01)
*G01J 3/46* (2006.01)

(52) U.S. Cl.
CPC ............... *G01J 3/526* (2013.01); *G01J 3/463* (2013.01)

(58) Field of Classification Search
None
See application file for complete search history.

(56) References Cited

U.S. PATENT DOCUMENTS

| | | | |
|---|---|---|---|
| 1,460,865 A | 7/1923 | Sharp | |
| 1,586,864 A | 6/1926 | Urie | |
| 2,300,360 A | 10/1942 | Remmers | |
| 2,729,898 A | 1/1956 | Rahr | |
| 3,000,113 A | 9/1961 | Olson | |
| 3,384,983 A | 5/1968 | Olson | |
| 4,604,061 A * | 8/1986 | Willcocks | G01J 3/526 |
| | | | 211/45 |
| 6,563,510 B1 * | 5/2003 | Rice | G01J 3/46 |
| | | | 345/530 |
| 8,467,090 B2 | 6/2013 | Minchew et al. | |
| 9,019,296 B1 * | 4/2015 | Abraham | G06Q 30/02 |
| | | | 345/593 |
| 9,019,297 B2 | 4/2015 | Buzyn et al. | |
| 9,563,342 B2 | 2/2017 | Reynolds et al. | |
| 2001/0033288 A1 * | 10/2001 | Nabeshima | G06T 11/001 |
| | | | 345/601 |
| 2004/0046802 A1 * | 3/2004 | Wright | G06F 3/04897 |
| | | | 715/810 |

(Continued)

*Primary Examiner* — Anh-Tuan V Nguyen
(74) *Attorney, Agent, or Firm* — The H.T. Than Law Group

(57) ABSTRACT

The present invention relates to physical and virtual color displays that are based on psychophysical color emotions and psychophysical color harmony. Such color displays assist the consumers to choose colors, more specifically paint or stain colors, based on the emotions of the consumers or the emotions of the colors, as well as the harmony of the colors.

26 Claims, 28 Drawing Sheets

(56) References Cited

U.S. PATENT DOCUMENTS

| | | | | |
|---|---|---|---|---|
| 2005/0111693 A1* | 5/2005 | Loce | ..................... | H04N 1/387 |
| | | | | 382/100 |
| 2006/0098025 A1* | 5/2006 | Jang | ..................... | G09G 5/02 |
| | | | | 345/594 |
| 2006/0170701 A1* | 8/2006 | Ok | ..................... | G09G 5/02 |
| | | | | 345/601 |
| 2007/0188512 A1* | 8/2007 | Ramirez | ..................... | G01J 3/02 |
| | | | | 345/593 |
| 2009/0251485 A1* | 10/2009 | Peiro | ..................... | H04N 1/6058 |
| | | | | 345/593 |
| 2011/0018895 A1* | 1/2011 | Buzyn | ..................... | G06T 11/001 |
| | | | | 345/594 |
| 2012/0021387 A1* | 1/2012 | Watanabe | ..................... | B44D 3/04 |
| | | | | 434/98 |
| 2012/0050312 A1* | 3/2012 | Kinch | ..................... | G09B 19/0023 |
| | | | | 345/594 |
| 2012/0210229 A1* | 8/2012 | Bryant | ..................... | H04N 9/73 |
| | | | | 715/723 |
| 2015/0130808 A1* | 5/2015 | Takagi | ..................... | G09G 5/06 |
| | | | | 345/428 |
| 2015/0154763 A1* | 6/2015 | Xian | ..................... | G06T 11/001 |
| | | | | 345/589 |

* cited by examiner

Table 1  Specifications of the 35 colour samples in CIELAB system

| Sample | Tone | Hue | L* | a* | b* | C* | h |
|---|---|---|---|---|---|---|---|
| 1 | Vivid | Red | 35.0 | 46.4 | 23.2 | 51.8 | 27 |
| 2 | | Orange | 56.7 | 30.6 | 52.1 | 60.4 | 60 |
| 3 | | Yellow | 79.2 | 2.6 | 61.3 | 61.4 | 88 |
| 4 | | Green | 34.1 | -25.8 | 17.0 | 30.8 | 147 |
| 5 | | Cyan | 34.6 | -17.8 | -8.9 | 19.9 | 206 |
| 6 | | Blue | 35.8 | -3.4 | -33.4 | 33.5 | 266 |
| 7 | | Purple | 35.7 | 36.9 | -23.6 | 43.8 | 327 |
| 8 | Pale | Red | 79.8 | 21.9 | 10.9 | 24.5 | 26 |
| 9 | | Orange | 79.6 | 13.1 | 22.2 | 25.8 | 59 |
| 10 | | Green | 79.5 | -19.4 | 12.6 | 23.1 | 147 |
| 11 | | Blue | 80.6 | -1.9 | -24.3 | 24.4 | 265 |
| 12 | | Purple | 80.3 | 19.5 | -12.1 | 23.0 | 328 |
| 13 | Dull | Red | 56.9 | 21.8 | 10.6 | 24.2 | 26 |
| 14 | | Yellow | 56.4 | 1.0 | 25.1 | 25.1 | 88 |
| 15 | | Cyan | 57.0 | -12.9 | -6.3 | 14.3 | 206 |
| 16 | Dark | Orange | 34.0 | 12.1 | 21.3 | 24.5 | 60 |
| 17 | | Green | 34.0 | -18.6 | 12.3 | 22.3 | 146 |
| 18 | | Blue | 35.0 | -1.4 | -24.1 | 24.2 | 267 |
| 19 | Light Greyish | Yellow | 79.6 | 0.9 | 12.9 | 13.0 | 86 |
| 20 | | Cyan | 79.9 | -6.8 | -2.8 | 7.3 | 203 |
| 21 | | Purple | 79.8 | 9.8 | -6.1 | 11.6 | 328 |
| 22 | Greyish | Red | 56.9 | 11.0 | 5.3 | 12.2 | 26 |
| 23 | | Orange | 56.6 | 6.2 | 11.1 | 12.7 | 61 |
| 24 | | Green | 56.6 | -10.0 | 6.5 | 11.9 | 147 |
| 25 | | Blue | 57.1 | -0.9 | -12.3 | 12.4 | 266 |
| 26 | | Purple | 57.1 | 9.4 | -5.9 | 11.2 | 328 |
| 27 | Dark Greyish | Red | 34.1 | 10.5 | 5.3 | 11.7 | 27 |
| 28 | | Yellow | 34.0 | 0.6 | 12.3 | 12.3 | 87 |
| 29 | | Cyan | 34.2 | -6.3 | -2.9 | 7.0 | 204 |
| 30 | | Purple | 34.6 | 9.2 | -5.6 | 10.8 | 329 |
| 31 | Achromatic | Black | 2.3 | -0.1 | -0.4 | 0.4 | 262 |
| 32 | | Dark Grey | 34.2 | -0.2 | 0.2 | 0.3 | 124 |
| 33 | | Mid Grey | 56.9 | -0.1 | 0.3 | 0.3 | 115 |
| 34 | | Light Grey | 80.0 | 3.2 | -0.9 | 3.4 | 345 |
| 35 | | White | 100.0 | -0.1 | 0.3 | 0.3 | 106 |

FIG. 4

Table 2: Specifications for Selected E1 Colors                    62-1

| Row-Column | Code | Color Name | L* | a* | b* | C*$_{ab}$ | h$_{ab}$ | E |
|---|---|---|---|---|---|---|---|---|
| 1-1 | 15-10 | Color A | 43.9 | 56.6 | 36.4 | 67.3 | 32.8 | 2.16 |
| 2-1 | 15-20 | Color B | 47.6 | 56.6 | 30.2 | 64.2 | 28.1 | 2.10 |
| 3-1 | 15-30 | Color C | 52.8 | 55.3 | 21.5 | 59.3 | 21.2 | 1.95 |
| 4-1 | 15-40 | Color D | 66.4 | 44.7 | 7.7 | 45.3 | 9.8 | 1.35 |
| 5-1 | 15-50 | Color E | 78.0 | 30.3 | 2.4 | 30.4 | 4.6 | 0.66 |
| 6-1 | 15-60 | Color F | 86.7 | 18.1 | 1.0 | 18.1 | 3.1 | 0.22 |
| 7-1 | 15-70 | Color G | 91.8 | 9.4 | 1.2 | 9.5 | 7.1 | 0.03 |
| 1-2 | 16-10 | Color AA | 45.4 | 57.4 | 40.1 | 70.1 | 34.9 | 2.25 |
| 2-2 | 16-20 | Color BB | 49.0 | 57.1 | 34.9 | 66.9 | 31.4 | 2.17 |
| 3-2 | 16-30 | Color CC | 54.8 | 54.4 | 26.1 | 60.3 | 25.6 | 1.95 |
| 4-2 | 16-40 | Color DD | 68.2 | 42.1 | 12.3 | 43.8 | 16.3 | 1.25 |
| 5-2 | 16-50 | Color EE | 79.9 | 27.6 | 5.2 | 28.1 | 10.7 | 0.57 |
| 6-2 | 16-60 | Color FF | 88.1 | 16.0 | 2.9 | 16.2 | 10.1 | 0.17 |
| 7-2 | 16-70 | Color GG | 93.1 | 7.7 | 2.1 | 8.0 | 15.2 | 0.01 |
| ... | ... | ... | | | | | | |
| 1-36 | 97-10 | Color AB | 37.4 | 49.5 | 18.5 | 52.8 | 20.5 | 1.61 |
| 2-36 | 97-20 | Color BBB | 42.1 | 50.9 | 10.8 | 52.1 | 12.0 | 1.65 |
| 3-36 | 97-30 | Color CCC | 48.6 | 51.2 | 2.6 | 51.2 | 2.9 | 1.64 |
| 4-36 | 97-40 | Color DDD | 64.7 | 40.4 | -5.2 | 40.7 | 352.6 | 1.11 |
| 5-36 | 97-50 | Color EEE | 77.6 | 27.2 | -6.3 | 27.9 | 347.0 | 0.53 |
| 6-36 | 97-60 | Color FFF | 86.4 | 16.5 | -4.1 | 17.0 | 345.9 | 0.16 |
| 7-36 | 97-70 | Color GGG | 92.1 | 8.7 | -1.5 | 8.9 | 350.1 | 0.01 |
| 1-37 | 98-10 | Color AC | 39.1 | 51.7 | 25.9 | 57.8 | 26.6 | 1.79 |
| 2-37 | 98-20 | Color BC | 43.5 | 53.0 | 18.8 | 56.2 | 19.6 | 1.80 |
| 3-37 | 98-30 | Color CC | 49.5 | 52.7 | 9.9 | 53.6 | 10.7 | 1.74 |
| 4-37 | 98-40 | Color DC | 64.7 | 42.3 | 0.2 | 42.3 | 0.3 | 1.21 |
| 5-37 | 98-50 | Color EC | 77.4 | 28.4 | -2.9 | 28.5 | 354.2 | 0.58 |
| 6-37 | 98-60 | Color FC | 86.5 | 17.1 | -2.2 | 17.2 | 352.7 | 0.18 |
| 7-37 | 98-70 | Color GC | 92.2 | 8.7 | -0.6 | 8.7 | 356.1 | 0.02 |

FIG. 8A

Table 3: Specifications for Selected E2 Colors          / 62-2

| Row-Column | Code | Color Name | L* | a* | b* | C*ab | hab | E |
|---|---|---|---|---|---|---|---|---|
| 1-1 | 12-10 | Color BA | 90.3 | 8.2 | 2.2 | 8.5 | 14.8 | -0.03 |
| 2-1 | 12-20 | Color BBC | 85.0 | 13.1 | 3.2 | 13.5 | 13.6 | 0.02 |
| 3-1 | 12-30 | Color BC | 78.1 | 17.4 | 1.2 | 17.4 | 4.0 | 0.08 |
| 4-1 | 12-40 | Color BD | 70.8 | 21.3 | 3.1 | 21.5 | 8.2 | 0.18 |
| 5-1 | 12-50 | Color BE | 62.2 | 25.3 | 3.0 | 25.5 | 6.7 | 0.31 |
| 6-1 | 12-60 | Color BF | 52.5 | 26.7 | 5.2 | 27.2 | 11.0 | 0.34 |
| 7-1 | 12-70 | Color BG | 40.5 | 27.3 | 11.5 | 29.6 | 22.9 | 0.39 |
| 1-2 | 13-10 | Color BAA | 87.9 | 9.1 | 4.6 | 10.2 | 26.7 | -0.04 |
| 2-2 | 13-20 | Color BAB | 83.2 | 12.5 | 3.6 | 13.0 | 15.9 | -0.03 |
| 3-2 | 13-30 | Color BCC | 76.9 | 17.4 | 5.1 | 18.1 | 16.2 | 0.08 |
| 4-2 | 13-40 | Color BDD | 68.5 | 20.4 | 6.8 | 21.5 | 18.3 | 0.13 |
| 5-2 | 13-50 | Color BEE | 62.3 | 24.1 | 6.7 | 25.0 | 15.4 | 0.27 |
| 6-2 | 13-60 | Color BFF | 54.5 | 23.8 | 7.5 | 24.9 | 17.5 | 0.21 |
| 7-2 | 13-70 | Color BGG | 42.2 | 24.2 | 9.4 | 25.9 | 21.2 | 0.21 |
| ... | ... | ... | | | | | | |
| 1-39 | 88-10 | Color CA | 31.1 | 24.7 | 7.3 | 25.8 | 16.5 | 0.24 |
| 2-39 | 88-20 | Color CB | 35.6 | 28.2 | 4.5 | 28.5 | 9.1 | 0.40 |
| 3-39 | 88-30 | Color CC | 42.2 | 30.7 | 0.2 | 30.7 | 0.5 | 0.53 |
| 4-39 | 88-40 | Color CD | 60.6 | 26.8 | -4.1 | 27.1 | 351.2 | 0.38 |
| 5-39 | 88-50 | Color CE | 74.8 | 19.4 | -4.9 | 20.0 | 345.8 | 0.14 |
| 6-39 | 88-60 | Color CF | 84.8 | 12.4 | -3.0 | 12.8 | 346.4 | -0.01 |
| 7-39 | 88-70 | Color CG | 91.7 | 6.6 | -0.9 | 6.6 | 352.3 | -0.04 |

FIG. 8B

Table 4: Specifications for Selected E3 Colours                              62-3

| Row-Column | Code | Color Name | L* | a* | b* | C*ab | hab | E |
|---|---|---|---|---|---|---|---|---|
| 1-1 | 61-10 | Color 1 | 87.0 | 5.7 | 2.7 | 6.3 | 25.3 | -0.14 |
| 2-1 | 61-20 | Color 2 | 82.9 | 7.5 | 2.3 | 7.9 | 17.2 | -0.18 |
| 3-1 | 61-30 | Color 3 | 75.5 | 10.8 | 4.0 | 11.5 | 20.5 | -0.20 |
| 4-1 | 61-40 | Color 4 | 66.3 | 13.6 | 4.2 | 14.3 | 17.3 | -0.21 |
| 5-1 | 61-50 | Color 5 | 50.4 | 16.7 | 5.5 | 17.6 | 18.3 | -0.18 |
| 6-1 | 61-60 | Color 6 | 42.3 | 17.4 | 4.6 | 18.0 | 14.8 | -0.17 |
| 7-1 | 61-70 | Color 7 | 32.7 | 17.8 | 6.9 | 19.1 | 21.3 | -0.13 |
| 1-2 | 62-10 | Great | 31.0 | 16.5 | 14.1 | 21.7 | 40.4 | -0.11 |
| 2-2 | 62-20 | Better | 32.6 | 17.0 | 13.5 | 21.7 | 38.5 | -0.10 |
| 3-2 | 62-30 | Best | 35.8 | 16.9 | 12.1 | 20.8 | 35.7 | -0.13 |
| 4-2 | 62-40 | Wonderful | 51.4 | 15.1 | 8.4 | 17.3 | 29.3 | -0.24 |
| 5-2 | 62-50 | Fantastic | 67.9 | 11.3 | 5.5 | 12.6 | 25.9 | -0.28 |
| 6-2 | 62-60 | Glorious | 80.5 | 8.0 | 4.4 | 9.1 | 28.5 | -0.20 |
| 7-2 | 62-70 | Stupendous | 89.1 | 4.8 | 3.5 | 6.0 | 35.9 | -0.11 |
| ... | ... | ... | | | | | | |
| 1-41 | 10-10 | Color 11 | 23.7 | 5.3 | -2.4 | 5.8 | 335.9 | -0.69 |
| 2-41 | 10-20 | Color 12 | 28.0 | 8.5 | -6.2 | 10.5 | 324.0 | -0.57 |
| 3-41 | 10-30 | Color 13 | 35.1 | 11.8 | -10.2 | 15.4 | 318.5 | -0.41 |
| 4-41 | 10-40 | Color 14 | 56.1 | 11.6 | -11.0 | 16.0 | 316.6 | -0.34 |
| 5-41 | 10-50 | Color 15 | 72.4 | 8.9 | -9.1 | 12.7 | 314.4 | -0.27 |
| 6-41 | 10-60 | Color 16 | 83.6 | 5.8 | -5.2 | 7.8 | 318.4 | -0.19 |
| 7-41 | 10-70 | Color 17 | 91.2 | 3.2 | -2.0 | 3.8 | 327.3 | -0.09 |
| 1-42 | 13-10 | Color 100 | 90.6 | 3.2 | 3.6 | 4.8 | 48.2 | -0.10 |
| 2-42 | 13-20 | Color 101 | 85.8 | 6.1 | 0.5 | 6.1 | 4.5 | -0.16 |
| 3-42 | 13-30 | Color 102 | 79.8 | 9.0 | -4.3 | 9.9 | 334.5 | -0.19 |
| 4-42 | 13-40 | Color 103 | 74.4 | 12.1 | -7.3 | 14.1 | 329.1 | -0.15 |
| 5-42 | 13-50 | Color 104 | 65.9 | 16.2 | -7.5 | 17.9 | 335.1 | -0.08 |
| 6-42 | 13-60 | Color 105 | 48.4 | 16.8 | -8.7 | 19.0 | 332.6 | -0.16 |
| 7-42 | 13-70 | Color 106 | 36.3 | 16.5 | -7.5 | 18.1 | 335.6 | -0.20 |

FIG. 8C

Table 5: Specifications for selected E4 Colours    /62-4

| Row-Column | Code | Colour Name | L* | a* | b* | C*$_{ab}$ | h$_{ab}$ | E |
|---|---|---|---|---|---|---|---|---|
| 1-1 | 52-10 | A | 24.0 | 4.4 | 5.8 | 7.3 | 52.8 | -0.69 |
| 2-1 | 52-20 | B | 29.4 | 6.3 | 4.9 | 8.0 | 38.0 | -0.70 |
| 3-1 | 52-30 | C | 37.7 | 7.7 | 3.5 | 8.5 | 24.6 | -0.70 |
| 4-1 | 52-40 | D | 58.4 | 7.5 | 2.1 | 7.7 | 15.8 | -0.58 |
| 5-1 | 52-50 | E | 74.7 | 5.0 | 0.8 | 5.1 | 8.7 | -0.38 |
| 6-1 | 52-60 | F | 85.3 | 3.2 | 1.2 | 3.4 | 20.7 | -0.21 |
| 7-1 | 52-70 | G | 92.0 | 1.7 | 1.7 | 2.4 | 45.9 | -0.09 |
| 1-2 | 53-10 | H | 30.7 | 7.1 | 8.9 | 11.4 | 51.5 | -0.61 |
| 2-2 | 53-20 | I | 34.2 | 7.0 | 8.3 | 10.9 | 49.7 | -0.65 |
| 3-2 | 53-30 | J | 37.5 | 6.7 | 7.2 | 9.9 | 47.0 | -0.69 |
| 4-2 | 53-40 | K | 54.1 | 4.9 | 5.3 | 7.2 | 46.9 | -0.70 |
| 5-2 | 53-50 | L | 70.6 | 3.1 | 3.4 | 4.6 | 47.1 | -0.49 |
| 6-2 | 53-60 | M | 82.2 | 2.2 | 3.0 | 3.7 | 54.1 | -0.27 |
| 7-2 | 53-70 | N | 90.0 | 0.9 | 2.6 | 2.8 | 70.7 | -0.12 |
| ... | | | | | | | | |
| 1-27 | 65-10 | O | 25.5 | 5.7 | 6.7 | 8.7 | 49.6 | -0.65 |
| 2-27 | 65-20 | P | 31.6 | 7.1 | 4.3 | 8.3 | 31.2 | -0.69 |
| 3-27 | 65-30 | Q | 40.5 | 8.0 | 1.9 | 8.2 | 13.6 | -0.69 |
| 4-27 | 65-40 | R | 61.4 | 6.6 | -0.4 | 6.6 | 356.3 | -0.57 |
| 5-27 | 65-50 | S | 76.5 | 3.9 | -1.4 | 4.2 | 339.9 | -0.37 |
| 6-27 | 65-60 | T | 86.7 | 2.3 | 0.0 | 2.3 | 0.4 | -0.19 |
| 7-27 | 65-70 | U | 92.5 | 1.0 | 1.0 | 1.4 | 44.7 | -0.08 |

FIG. 8D

1. Select input format, either XYZ or R%
2. Select light source for XYZ input
3. Select 2-colour or 3-colour combinations
4. Calculate from input of R%
   4.1 Transform all R% to $(XYZ)_{D65}$, $(XYZ)_A$, $(XYZ)_{TL84}$, $(XYZ)_{F2}$ and $(XYZ)_{BMD}$. Predict all non D65 XYZ values to those under D65 via CAT02 chromatic adaptation transform
   4.2 Calculate CE and CH values
5. Calculate from input of XYZ
   5.1 If it is $(XYZ)_{D65}$, calculate CE and CH values
   5.2 If it is not $(XYZ)_{D65}$, use CAT02 to transform all the others to $(XYZ)_{D65}$ and then calculate CE and CH values

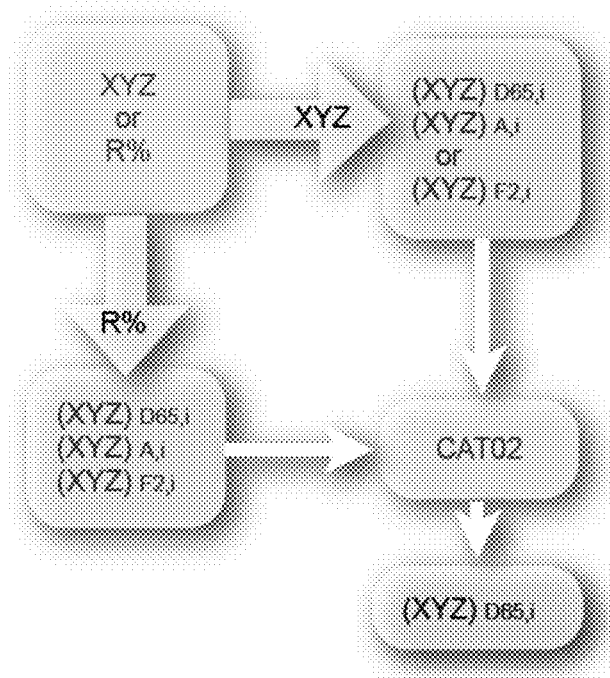

FIG. 19

COLOR DISPLAYS BASED ON COLOR EMOTIONS AND COLOR HARMONY

CROSS-REFERENCE TO RELATED PATENT APPLICATIONS

The present patent application is a continuation-in-part under 35 U.S.C. § 120 of non-provisional U.S. patent application Ser. No. 12/668,352 entitled "Color Selection System," filed on 8 Jan. 2010, which is a U.S. national phase under 35 U.S.C. § 371 of international patent application PCT/US08/069823, filed on Jul. 11, 2008, which claims priority to U.S. provisional patent application Ser. No. 60/929,743 filed on Jul. 11, 2007. The disclosures of all parent patent applications are incorporated by reference herein in their entireties.

BACKGROUND INFORMATION

Color selection tools are used in various sectors, including the paint industry, to assist consumers and professional designers in choosing appealing color combinations. The abundance of available color choices can make it challenging at times for both untrained consumers and experienced designers to select appealing color combinations, even with the aid of existing color selection tools.

Conventional color selection tools, including computerized color selection tools, rely on conventional color theories, such as complementary colors, triad colors, split complementary colors, monochromatic colors, tetrad colors, pentrad or hexrad colors, which rely solely on the color wheels and the hue angles to organize colors. Other color selection tools also rely on the lightness/value, or saturation/chroma variables. However, color variables such as lightness, values, saturation or chroma are difficult for consumers and non-experts to comprehend in a useful way or in a way that can assist consumers to select paint colors.

Accordingly, there is a need for a color selection system that can assist consumers or other users in reaching confident and satisfying color selection choices.

SUMMARY

The present invention relates to physical or virtual, tangible color displays that are based on psychophysical color emotions and psychophysical color harmony. Such color displays assist the consumers to choose colors, more specifically paint or stain colors, based on the emotional environment the consumer wishes to create, as well as the harmony of the colors.

While the lightness, value, saturation, hue and chroma variables are not common household terms, emotions such as exciting/calm, inviting/uninviting, warm/cool, light/dark, clean/dirty, happy/depressing, fun/serious, etc., can be readily understood by people untrained in color theories. Paint color chips that can be arranged by such color emotions and preferably in a harmonious fashion are readily understood by consumers and can expedite the paint color selection process, and result in a more satisfactory outcome compared to traditional methods.

Embodiments of color selection and display methods and devices are described herein.

The present invention relates to a color display comprising a plurality of colors arranged on a tangible substrate wherein the plurality of colors are arranged as spokes disposed on both sides of a central axis. The central axis preferably extends from warm colors to cool colors and each spoke preferably ranges from dark colors to light colors. The colors from two co-planar spokes located across the central axis from each other should have substantially the same hue. The colors on the substrate comprise first color emotion values based on a first psychophysical equation, and the first color emotion values of said colors are within a predetermined range or have a predetermined average.

Preferably, the first color emotion value is an exciting-calming color emotion. Preferably, each spoke ranges from dark colors proximate to the central axis to light colors away from the central axis. The warm and cool colors and the dark and light colors are preferably based on corresponding psychophysical equations.

The colors arranged on same position away from the central axis on the spokes are harmonious to each other, or the colors located on a same column parallel to the central axis are harmonious to each other. Alternatively, the colors located on two adjacent columns parallel to the central axis are harmonious to each other.

The plurality of colors of the inventive color display may form a butterfly or hour-glass pattern. The tangible substrate may form a backing surface of a cabinet or may be a computer screen. The present invention also refers to a set of color displays comprising a plurality of said color displays, wherein the plurality of colors in each of said color displays have a unique predetermined average or a predetermined range of first color emotion values.

The present invention also relates to method for applying psychophysical color emotions to select colors for a color palette comprising the steps of (i) arranging the colors relative to at least three axes on at least one tangible substrate, wherein at least one axis is based on a color emotion;

(ii) selecting a group of colors for the color palette based on the positions of the colors relative to the at least three axes.

The selecting step may comprise the step of keeping a value on a first axis substantially constant and vary the values on a second or a third axis. The selecting step may comprise the step of keeping values on a first and a second axes substantially constant and vary the value on a third axis. Preferably, the arranging step is calculated by a processor programmed with at least one psychophysical equation for color emotion using tristimulus coordinates of the colors.

The color emotions include, but are not limited to, exciting-calm, inviting-uninviting, warm-cool, light-dark, clean-dirty, happy-depressing and fun-serious and combinations thereof.

BRIEF DESCRIPTION OF THE DRAWINGS

Embodiments will now be described, by way of example only, with reference to the attached Figures, wherein:

FIG. 4 is a table illustrating color elements used in testing to develop color harmony and color emotion models;

FIGS. 8A-8D illustrate data used to represent color groups in a color library;

FIG. 19 illustrates a dynamic link library routine;

Like reference numerals are used throughout the Figures to denote similar elements and features.

DETAILED DESCRIPTIONS OF THE PREFERRED EMBODIMENTS

Figure 1:
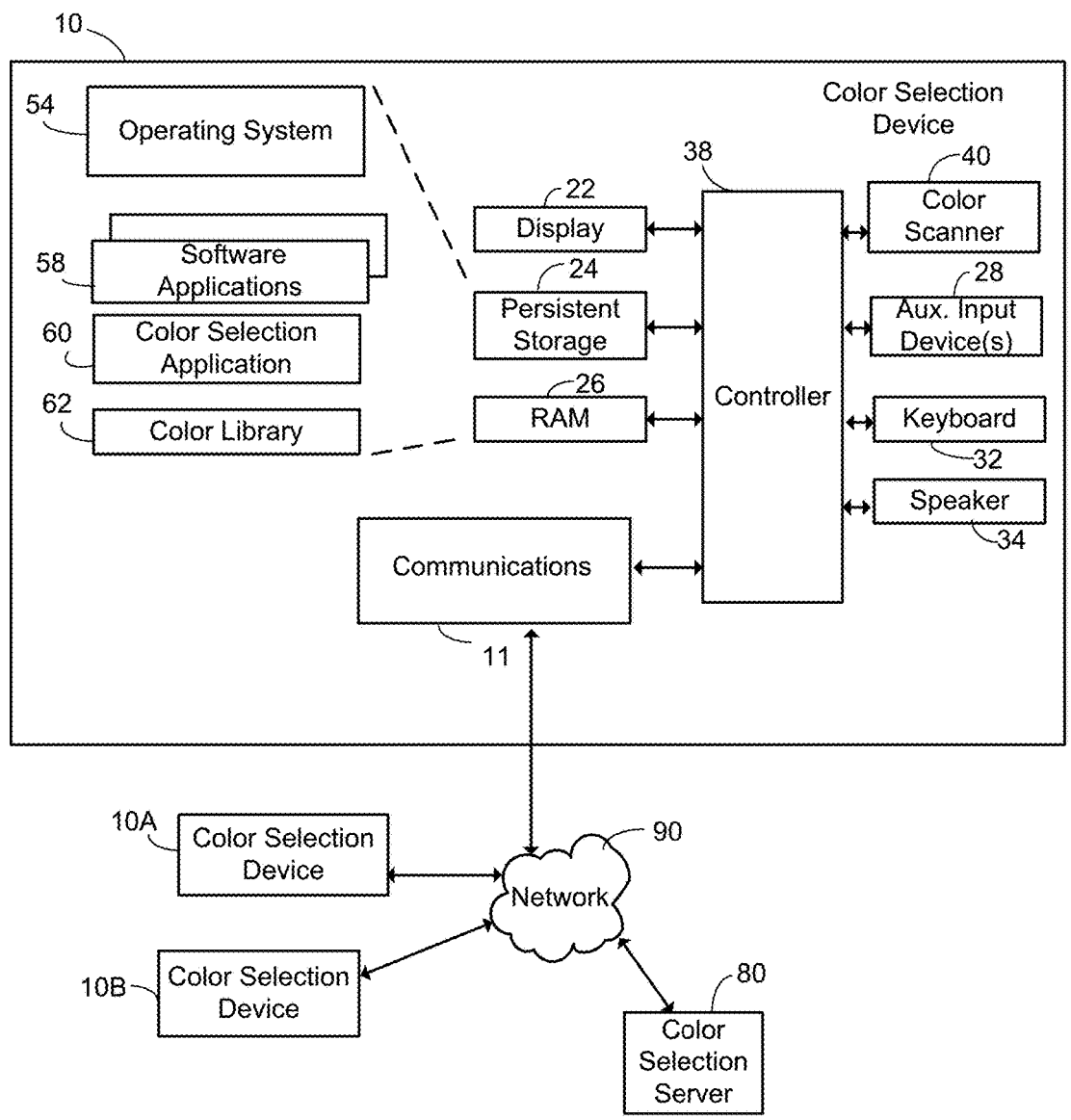
FIG. 1 is a block diagram of a color selection device to which embodiments described herein can be applied.

Example embodiments of the present invention relate to a color selection system for assisting consumers and designers to search desired colors and develop color schemes that can evoke specific emotions and create harmony. FIG. 1 shows a block diagram of an example of a color selection device 10 to which example embodiments of the described invention may be applied. In at least some example embodiments, the device 10 can be implemented by a suitably configured digital computing device, including for example a personal computer such as a desktop computer or lap top computer, or a mobile computing device such as a personal digital assistant, smart phone, or other small size or hand held computing device.

In at least one example embodiment, the device 10 includes a communication subsystem 11 for two-way communications with a network 90. The device 10 includes a controller 38 that can include one or more microprocessors that control the overall operation of the device. The controller 38 interacts with communications subsystem 11 and also interacts with further device subsystems such as a display 22, persistent storage 24, random access memory (RAM) 26, keyboard or keypad 32, speaker 34, auxiliary input device 28 (for example a mouse, touch screen, scroll-ball, scroll-wheel, multi-directional navigation key, touch-pad, microphone, and/or other user input devices) and other device subsystems. In at least some example embodiments, the controller 38 also interacts with a color scanner subsystem 40 that permits a user of the device 10 to input color data. In some embodiments, the color selection device 10 is configured to communicate with a color selection server 80 through a network 90. The network 90 can in various embodiments include, among other things, a wide area network such as the Internet, a direct connection, a local area network (LAN), a wireless communication link, and any combinations thereof.

Operating system software 54 and various software applications 58 used by the controller 38 are stored in the persistent storage 24 (which for example may include a hard drive or flash memory or other persistent store). In example embodiments, a color selection software application 60 is stored in the persistent storage 24 for configuring the controller 38 and device 10 to perform the color display and selection functions described below. A color library 62 which contains color data is also stored in the persistent storage 24. Parts or all of the color selection application 60, the color library 62, the operating system 54, and specific device applications 58 may be temporarily loaded into a volatile store such as RAM 26 and executed by the controller 38.

The color selection application 60 and supporting color library 62 may, for example, be loaded onto the device 10 from a physical medium such as a floppy disk or flash drive, or be loaded onto the device 10 from through the network 90 (for example from server 90). In some example embodiments, the color selection application 60 configures device 10 to periodically contact the color selection server 80 (which may for example be associated with a predetermined IP address) for available updates either to the color selection application 60 or the supporting color library 62 and upon receiving user confirmation download available updates. In example embodiments, CIELAB color data is stored in or derived from color library 62 for use in psychophysical perception models as described below. In at least some example embodiments such CIELAB data represents values that correspond to colors viewed under an D65 illuminant at the standard observer angle of 10 degrees.

In at least some example embodiments, the display 22 of the device 10 includes a calibrated display screen that has been preconfigured and tested to display colors within strict tolerances to represent actual colors as viewed under pre-defined lighting conditions. For example, such a calibrated display 22 could be provided on a color selection device 10 located at a retail outlet such as a paint store, and the device 10 could be part of a wider network that includes a plurality of color selections devices 10, 10A, 10B etc. that are located in a plurality of retail outlets and connected through network 90 to receive periodic updates from and exchange information with color selection server 80. In some embodiments color selection device 10 may be device owned and operated by an interior designer or a typical consumer, without a specially calibrated screen.

In some example embodiments, the color selection application 60 and the color library 62 may not be permanently stored at or executed on the actual device 10 at which the resulting color selection information is displayed. For example, the color selection application 60 and color library 62 can in some embodiments be a remote web-based application that is stored at the server 80 and executed on a controller of the server 80, with the resulting color selection information sent over network 90 and displayed at the user color selection device 10. In some example embodiments, some or all of the functionality of and information in the color selection application 60 and the color library 62 may be distributed among multiple computing devices for example some of the functions may be carried out at a local user color selection device 10 and some carried out at the remote color selection server 80. In some example embodiments, information about at least some of the users of the system may be stored at the color selection server 80 such as color preferences based on previous colors viewed and previous colors purchased, for example.

Figure 2:
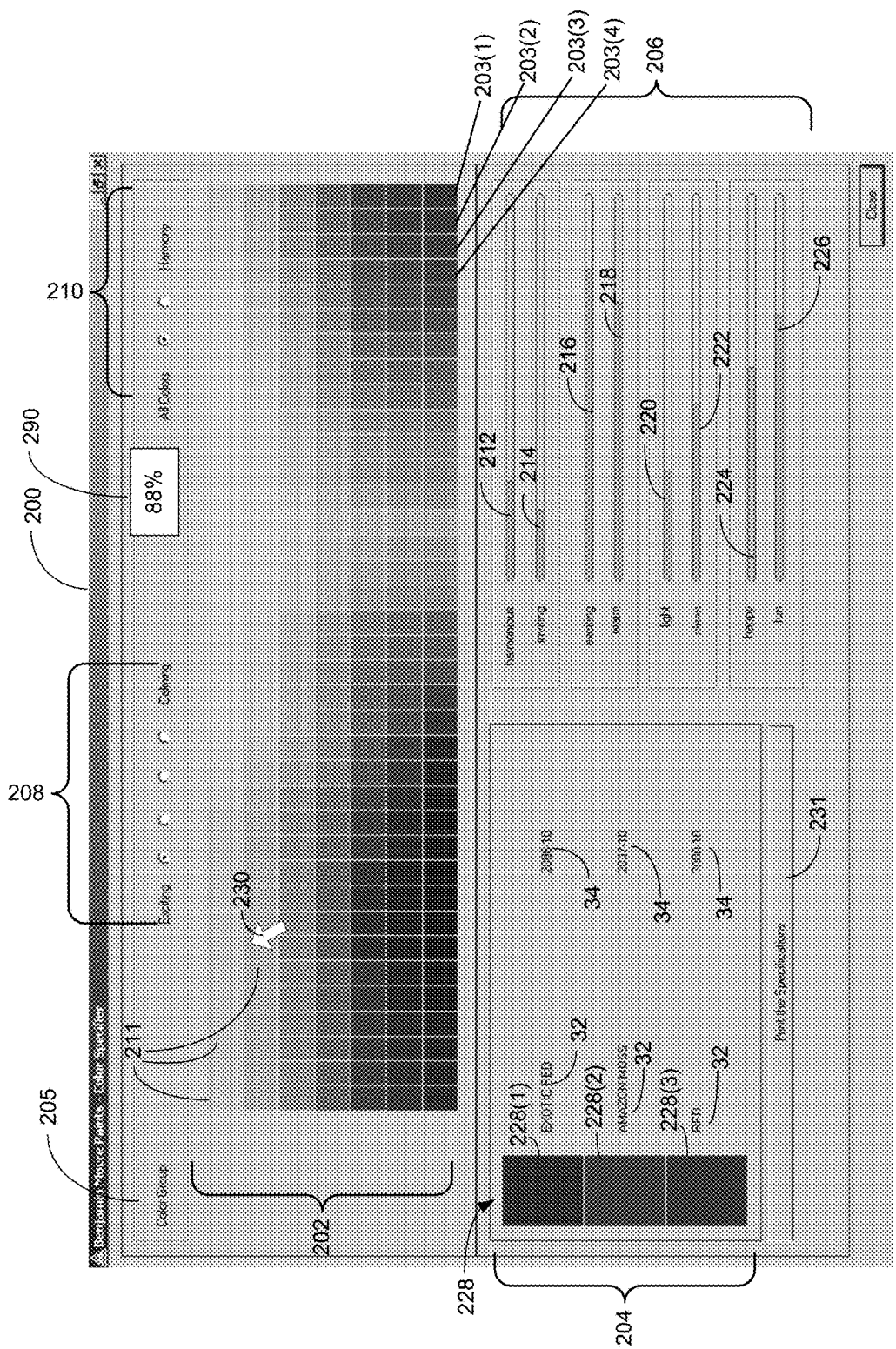
FIG. 2 shows an example of a first graphical user interface that can be used with the mobile electronic device of FIG. 1.

Having provided an overview of example environments in which the color selection system can be implemented, the operation of the color selection system in the context of a color selection application 60 and color library 62 stored on a color selection device 10 as shown in FIG. 1 will now be discussed in greater detail. In this regard, FIG. 2 shows an example of a color selection visual graphical user interface 200 which may be displayed on a display 22 of the device 10. The visual interface 200 includes first and second color display regions 202 and 204. The first color display region 202 displays a color palette or group of user selectable colors as an array of color elements 211 which each represent a unique color. In one example embodiment, the color elements 211 are presented as an electronic version of a fan deck in which the colors samples are arranged vertically by color depth (increases from top to bottom—as color depth increases, chroma changes and lightness drops) and horizontally by hue angle, although other schemes can alternatively be used to arrange the color elements 211, and the samples need not be displayed in an array format—for example the color elements 211 in the color group display region 202 could alternatively be arranged in a color wheel or using some other color presentation method.

The visual interface 200 includes a navigation and selection marker 230 that is moved on display 22 in response to user inputs through user input devices 28 and/or keyboard 62 to facilitate user selection of color elements 211 and allow the user to select and use the various features of the visual interface 200.

In one example embodiment, different color groups can selectively be displayed in the color group display region 202 and interface 200 includes a "color group" tool bar 205 that allows a user to select which color group is displayed. In the illustrated embodiment, the color group tool bar permits a user to select a color group for display region 202 in dependence on (i) an emotional response that the colors evoke ("color emotion") and (ii) a level of color harmony for the colors. With respect to color emotion, the color group tool bar 205 includes a primary group selection option in the form of an "Exciting-Calming" scale 208 which has four discrete user selectable levels, each of which is associated with a different color group as will be explained in greater detail below. With respect to color harmony, the color group tool bar 205 includes a secondary group selection option in the form of user selectable "All Colours" or "Harmony" choices 210 which respectively allow the user to either view all color elements 211 for the selected "Exciting-Calming" color group or to only view a subset of the color elements 211 that fall within a predetermined level of harmony, as will be explained in greater detail below.

The second display region 204 in visual interface 200 functions as a working area for color evaluation of user selected color candidates. In one example embodiment, a user can select desired colors from the color elements 211 displayed in the first display region 202 using the marker 230 (for example by double clicking on the desired color element 211, or dragging and dropping the desired color element). Once a user selects a color element 211 from the color group display region 202, an enlarged corresponding color candidate sample 228 representing the selected color is displayed in the second display region 204. In the illustrated example, three user selected color candidate samples 228(1), 228(2) and 228(3) are shown in the second display region 204, which may also include further information about the selected color elements, including color names 232 and color ID codes 234 for example.

The interface 200 also includes a third display region 206 which includes a number of different bar scales for displaying information to the user about the color harmony of the selected color candidate samples 228 and emotions evoked by the selected color candidate samples. In particular, the illustrated third display region 206 includes a color harmony scale 212, and the following color emotion scales: Inviting-uninviting 214; exciting-calming 216; warm-cool 218; light-dark 220; clean-dirty 222; happy-depressing 224; and fun-serious 226. In the illustrated version of interface 200, only the first word in each of the color emotion scales is displayed. Fewer, additional, or different harmony and/or color emotion scales can be included in feedback region 206 in different embodiments. In some embodiments, the color harmony scale may be omitted, and in some embodiments the color emotion scales may be omitted.

As will be appreciated from the above description, the visual interface 200 relies on color harmony and color emotion scores to display color groups or provide feedback on selected colors. In example embodiments, the color harmony and color emotion scores used to render the visual interface 200 are determined in dependence on quantitative mathematical models derived from psychometric data obtained from actual test subjects based on their psychophysical reactions to colors. In order to facilitate a further understanding of the color selection system presented herein, an explanation of the color library 62 and the quantitative models used to determine the color harmony and color emotion scores will now be provided.

Color Harmony and Color Emotion Models

In order to provide some background for the color harmony and color emotion models, reference is made to following four documents which describe examples of color harmony and color emotion models and how such models are derived. The following references are incorporated herein by reference:

(1) Ou, L., Luo, M. R., Woodcock, A., and Wright, A., "A study of colour emotion and colour preference, Part I: colour emotions for single colours", Color Research and Application, Volume 29, number 3, pages 232-240, June 2004.

(2) Ou, L., Luo, M. R., Woodcock, A., and Wright, A., "A study of colour emotion and colour preference, Part II: colour emotions for two-colour combinations", Color Research and Application, Volume 29, Number 4, pages 292-298, August 2004.

(3) Ou, L., Luo, M. R., Woodcock, A., and Wright, A., "A study of colour emotion and colour preference, Part III: colour preference modelling", Color Research and Application, Volume 29, Number 5, Pages 381-389, October 2004.

(4) Ou, L., Luo, M. R., "A colour harmony model for two-colour combinations", Color Research and Application, Volume 31, Number 3, pages 191-204, June 2006.

A further reference that in incorporated herein by reference is: (5) N. Moroney, M. Fairchild, R. Hunt, R. Luo and T. Neuman, "The CIECAM02 Color Appearance Model", IS&T/SID Tenth Color Imaging Conference, Nov. 12, 2002, ISBN:0-89208-241-0.

In one example embodiment, the models used in the color selection system according to example embodiments of the present invention model human psychophysical perceptions of colors and color combinations and were developed using data obtained from test subjects who were presented with single colors and combinations of up to three colors and requested to assess the colors by making a categorical judgements using bi-polar color emotion scales and color harmony scales.

Figure 3:
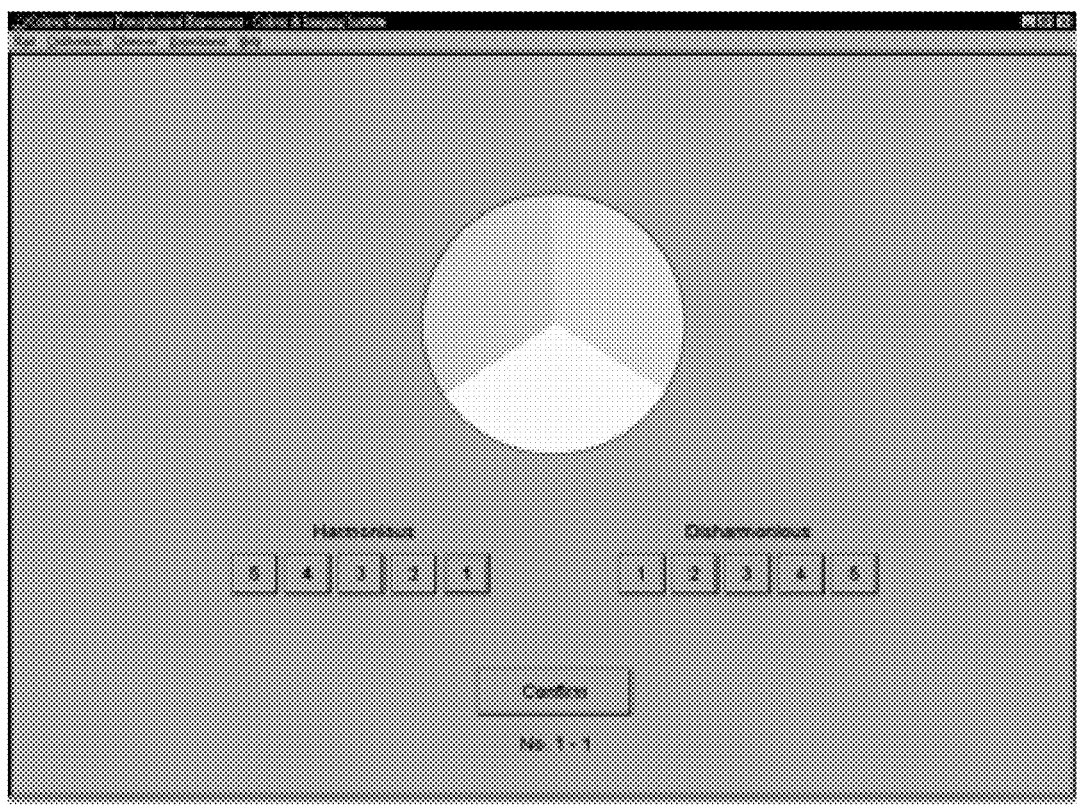
FIG. 3 shows an example of an image showing a three color wheel used in testing for developing a color harmony model.

By way of example, in order to develop a model for color harmony for 3-color combinations, a psychophysical perception experiment was conducted to have test subjects assess 6545 three-color wheels that included all possible three color combinations generated from 35 different color elements (see Table 1 of FIG. 4) that were each selected from the CIELAB color space, with illuminant D65 and standard observer (10 degrees). The 35 different color elements were selected to cover a large color gamut of the CIELAB color space. FIG. 3 illustrates a screen layout for the experiment in which each observer was presented with color wheels displayed individually on a calibrated CRT monitor in a darkened room. Each observer assessed the degree of harmony for each color wheel using a 10-category scale ranging from "extremely harmonious" to "extremely disharmonious" after being advised that harmonious means "forming a pleasing or consistent whole" and disharmonious means "lack of harmony". Torgerson's Law of Categorical Judgement [Torgerson, W. S., "Theory and Methods of Scaling", John Wiley & Sons, New York, 1958] was used to transform the experimental data onto an interval scale. The resulting scale values are called colour harmony scores, indicating the degree of harmony for each colour wheel; the higher the score, the more harmonious the colour wheel appeared to the observers. Based on the results of such testing the color harmony model discussed below was developed.

Figure 5:
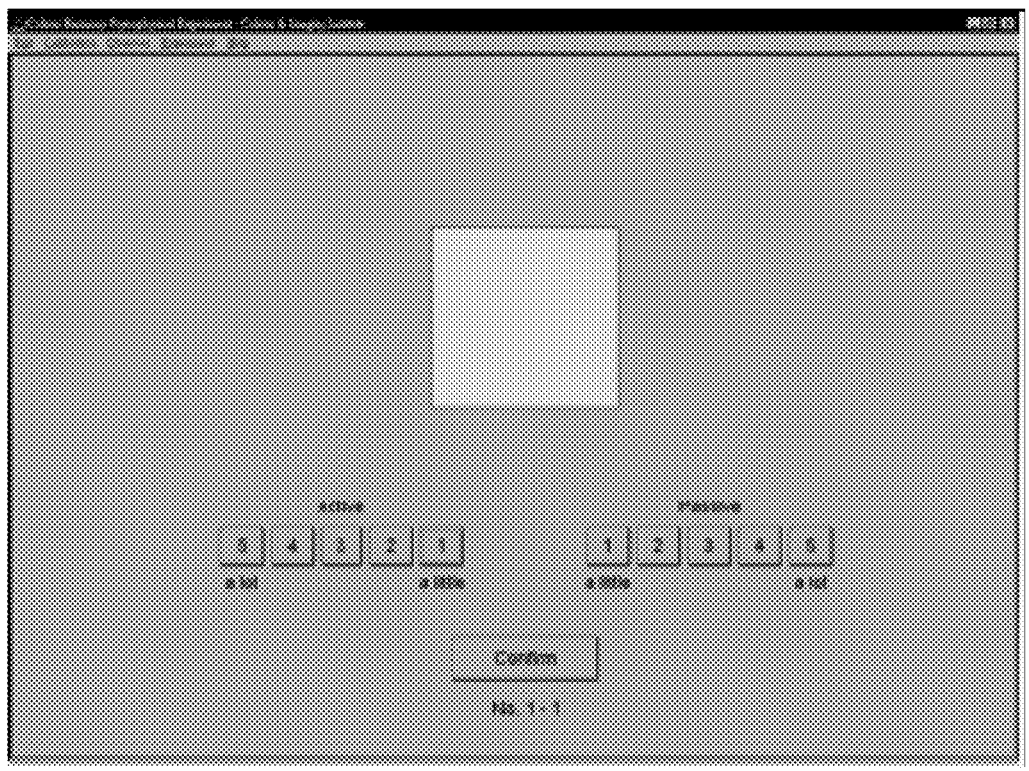
FIG. 5 shows an example of an image showing a single color patch used in testing for developing a human response model.
Figure 6:
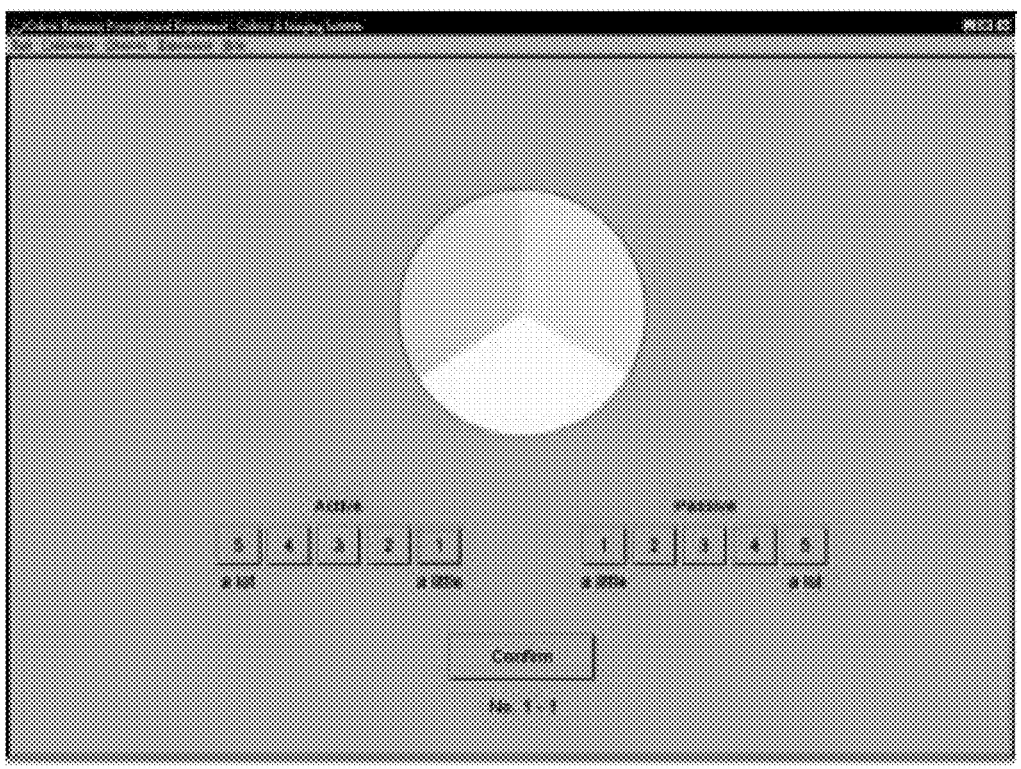
FIG. 6 shows an example of an image showing a three color wheel used in testing for developing a human response model.

Similar testing was performed to develop models for each of the seven color emotions scales 214-226 discussed above. For example, for developing color emotion models, a psychophysical experiment was carried out using 35 single color patches (using the colors shown in table 1 of FIG. 4) and 90 three-color wheels as stimuli. FIGS. 5 and 6 respectively show examples of a single color patch and a three color wheel presented to a test subject on a calibrated CRT monitor in a darkened room. Each observer assessed the degree of color emotion for each color patch and each color wheel using a 10-category scale for each of the seven color emotion scales after being advised of the following dictionary meanings associated with each of the scales:

(1) Exciting-Calming
exciting: causing great enthusiasm and eagerness
calming: making (someone) tranquil and quiet
(2) Inviting-Uninviting:
inviting: offering the promise of an attractive or enjoyable experience
uninviting: unappealing; unattractive
(3) Warm-Cool:
warm: of or at a fairly or comfortably high temperature
cool: of or at a fairly low temperature
(4) Light-Dark:
light: having a considerable or sufficient amount of natural light
dark: with little or no light
(5) Clean-Dirty:
clean: free from dirt, marks, or stains
dirty: covered or marked with an unclean substance
(6) Happy-Depressing:
happy: feeling or showing pleasure or contentment
depressing: causing or resulting in a feeling of miserable dejection
(7) Fun-Serious:
fun: amusing, entertaining, or enjoyable
serious: acting or speaking sincerely and in earnest, rather than in a joking or halfhearted manner Based on assessments provided by the test participants, the following psychophysical perception models have been developed and are used in example embodiments of the present invention to determine color emotion scores:

(1) Exciting-Calming:
For a single color, the model used for determining a psychophysical perception color emotion score on the "Exciting-Calming" scale is:

$$\text{Exciting} = -1.13 + 0.02\left[(L^* - 40)^2 + \left(\frac{a^*}{0.37}\right)^2 + \left(\frac{b^*}{0.60}\right)^2\right]^{\frac{1}{2}} \quad \text{Equation (1)}$$

where L*, a* and b* represent the three CIELAB coordinates for the color considered. As known in the art, the three parameters L*, a* and b* in the CIELAB model represent the three dimensions of a color space as follows: L*—the lightness coordinate indicating the lightness level of the color; a*—the red/green coordinate, with +a* indicating red, and—a* indicating green; and b* the yellow blue/coordinate, with +b* indicating yellow, and—b* indicating blue. CIELAB model is further described in the CIE (commission internationale de l'eclairage) publication "Colormetry", 3$^{rd}$ Edition, Publication CIE 15:2004, ISBN 3 901 906 339.

(2) Inviting-Uninviting:
For a single color, the model used for determining a human psychophysical perception color emotion score on the "Inviting-uninviting" scale is:

$$\text{Inviting} = -1.6 + 0.009\left[(L^* - 13)^2 + \left(\frac{a^* - 3}{0.19}\right)^2 + \left(\frac{b^* - 19}{0.29}\right)^2\right]^{\frac{1}{2}} + 0.015L^* \quad \text{Equation (2)}$$

where L*, a* and b* represent the three CIELAB coordinates for the color considered.

(3) Warm-Cool:
For a single color, the model used for determining a human psychophysical perception color emotion score on the "Warm-Cool" scale is:

$$\text{Warm} = 0.02 + 0.12(C^*_{ab}))^{0.6} \cos(h_{ab} - 45°) - (1.5 \times 10^{-8})(L^*)^{3.9} \quad \text{Equation (3)}$$

where C*ab, hab and L* represent CIELAB chroma, hue angle and lightness for the color considered.

(4) Light-Dark:
For a single color, the model used for determining a human psychophysical perception color emotion score on the "Light-Dark" scale is:

$$\text{Dark} = -2.1 + 0.05(100 - L^*) \quad \text{Equation (4)}$$

where L* represents the CIELAB lightness value for the color considered.

(5) Clean-Dirty:
For a single color, the model used for determining a human psychophysical perception color emotion score on the "clean-dirty" scale is:

$$\text{Clean} = -1.8 + 0.043\left[(L^* - 28)^2 + \left(\frac{a^* - 3}{1.18}\right)^2 + \left(\frac{b^* - 27}{1.27}\right)^2\right]^{\frac{1}{2}} \quad \text{Equation (5)}$$

where L*, a* and b* represent the three CIELAB coordinates for the color considered.

(6) Happy-Depressing:
For a single color, the model used for determining a human psychophysical perception color emotion score on the "happy-depressing" scale is:

$$\text{Happy} = -1.3 + 0.025\left[(L^* - 14)^2 + \left(\frac{a^*}{0.73}\right)^2 + \left(\frac{b^* - 12}{0.85}\right)^2\right]^{\frac{1}{2}} \quad \text{Equation (6)}$$

where L*, a* and b* represent the three CIELAB coordinates for the color considered.

(7) Fun-Serious:
For a single color, the model used for determining a human psychophysical perception color emotion score on the "Fun-Serious" scale is:

$$\text{Fun} = -1.8 + 0.027\left[(L^* - 10)^2 + \left(\frac{a^*}{0.45}\right)^2 + \left(\frac{b^* - 10}{0.61}\right)^2\right]^{\frac{1}{2}} \quad \text{Equation (7)}$$

where L*, a* and b* represent the three CIELAB coordinates for the color considered.

Color Emotion Scores for Color Combinations

For modeling color emotion scores for two and three color combinations on six of the seven color emotion scales noted above (excluding the "inviting-uninviting" scale), an additivity property is employed in that the color emotion scores are calculated individually using the above models for each of the colors in the combination, and then averaged to determine a color emotion score for the combination. In particular, for a two color combination the color emotion score for the two color combination can be determined as follows:

$$E = (E1 + E2)/2 \quad \text{Equation (8)}$$

where E stands for a color emotion score for the two-color combination; and E1 and E2 represent color emotion scores of the two constituent colors in that combination.

Similarly, for a three color combination the color emotion score for the two color combination can be determined as follows:

$$E = (E1 + E2 + E3)/3 \quad \text{Equation (9)}$$

where E stands for a color emotion score for the two-color combination; and E1 to E3 represent color emotion scores of the constituent colors in that combination.

Thus, the color emotion score in the exciting scale for a combination of two or three colors can be determined by averaging the "exciting-calming" color emotion scores determined individually for each of the constituent colors in that combination. The color emotion scores for color combinations on each of the other color emotion scales (excluding the "inviting-uninviting" scale) can similarly be determined. It is projected that in at least some embodiments, color emotion scores for combinations of greater than three colors can be assigned by using similar averaging methods such that the color emotion score for a color combination can be determined by averaging all the emotion scores of all the colors in the combination.

Figure 7:
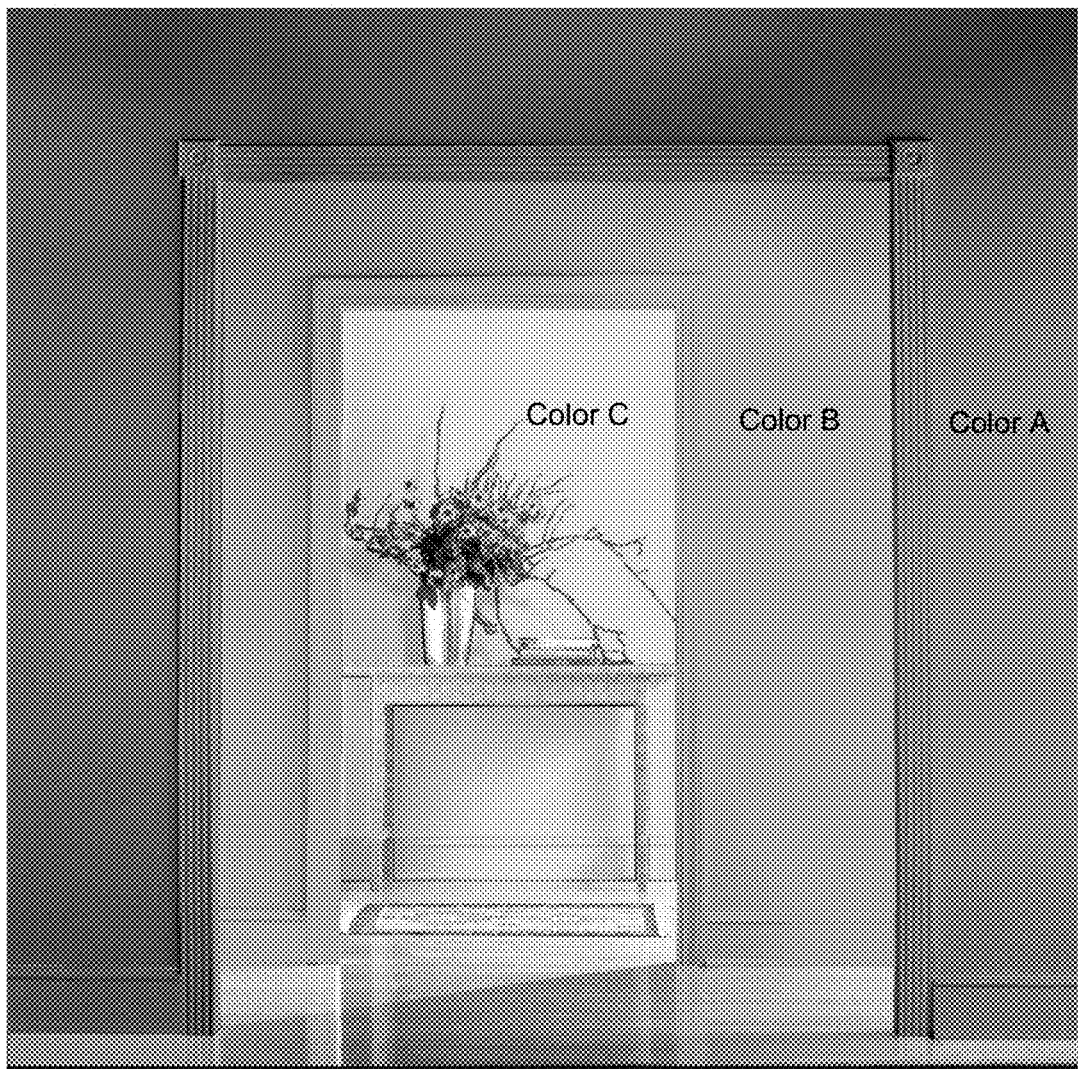
FIG. 7 shows an example of an image illustrating adjacent and non adjacent colors.

Color Emotion Scores for Color Combinations Using the "Inviting-Uninviting" Scale Although in some example embodiments straight averaging of the individual color "inviting-uninviting" scale color emotion scores can be used to determine an approximate "inviting-uninviting" scale score for the combination, test results have indicated that the correlation between modeled results and actual measured test results for color combinations using averaging is not as accurate for the "inviting-uninviting" scale as it is for the other six color emotion scores. Accordingly, in at least some example embodiments, a different model is used for determining color emotion scores for color combinations on the "inviting-uninviting", and a distinction is made between adjacent and non-adjacent colors, and in this regard reference is made to FIG. 7 which illustrates a three color combination including Color A, Color B, and Color C. Color B is adjacent to both Color A and Color C. As Color C and Color A are separated from each other, they are non-adjacent.

The "inviting-uninviting" combined color model consists of two parts, one (Inviting$_A$) dealing with adjacent colors and the other (Inviting$_N$) nonadjacent colors, as shown in Equations (10) and (11), respectively.

For adjacent colours:

$$\text{Inviting}_A = -0.15 + 0.14 I_C + 0.89 I_{Lsum} + 0.74 I_{\Delta L} + 0.51 I_H \quad \text{Equation (10)}$$

where $I_C = 0.6 \tan h(1.8 - 0.05 \Delta C_I)$ $\Delta C_I = [(\Delta H^*_{ab})^2 + (\Delta C^*_{ab}/0.84)^2]^{1/2}$ $I_{Lsum} = -1.2 + 0.012 L_{sum}$ in which $L_{sum} = L^*_1 + L^*_2$ $I_{\Delta L} = 0.15 + 0.16 \tan h(-2 + 0.19 \Delta L)$ in which $\Delta L = |L^*_1 - L^*_2|$ $I_H = I_{SY1} + I_{SY2}$ $I_{SY} = E_C(I_S + E_Y)$ $E_C = 0.5 + 0.5 \tan h(-2 + 0.5 C^*_{ab})$ $I_S = -0.08 - 0.14 \sin(h_{ab} + 50°) - 0.07 \sin(2h_{ab} + 90°)$ $E_Y = [(0.22 L^* - 12.8)/10] \exp\{(90° - h_{ab})/10 - \exp[(90° - h_{ab})/10]\}$ where L*, C*$_{ab}$ and h$_{ab}$ stand for values of lightness, chroma and hue angle in CIELAB system, respectively (with subscripts 1 and 2 each used in the above variables to denote scores associated with the first and second colors respectively in the two color combination).

For nonadjacent colours:

$$\text{Inviting}_N = -0.16 + 0.41 I_C \quad \text{Equation (11)}$$

The model for determining the "inviting-uninviting" color emotion score for colour combinations considering both adjacent and nonadjacent colors is:

$$\text{Inviting} = \frac{1}{n}\left[\sum(\text{Inviting}_A) + \sum(\text{Inviting}_N)\right] \quad \text{Equation (12)}$$

Color Harmony Models:

With respect to color harmony, based on the assessments provided by the test subjects, the following models have been developed and are used in example embodiments of the present invention to determine color harmony scores for color combinations. Again, in at least some example embodiments a differentiation is made between adjacent colors and non adjacent colors in color combinations, and thus the color harmony includes two parts, namely $CH_A$ for assigning a color harmony score for a pair of adjacent colors in a color combination (see Equation 13 below), and $CH_N$ for assigning a color harmony score for a pair on non-adjacent colors in a color combination (see Equation 14 below). Once color harmony scores for all color pairs within a color combination are determined, the scores are averaged as indicated below to determine a color harmony score for the entire combination (see Equation 15 below).

In example embodiments, color harmony ($CH_A$) for two adjacent colors is determined using the following equation:

$$CH_A = H_C + H_L + H_H \quad \text{Equation (13)}$$

in which $$H_C = 0.04 + 0.53 \tan h(0.8 - 0.045\Delta C)$$

$$\Delta C = [(\Delta H^*_{ab})^2 + (\Delta C^*_{ab}/1.46)^2]^{1/2}$$

$$H_L = H_{Lsum} + H_{\Delta L}$$

$$H_{Lsum} = 0.3 + 0.5 \tan h(-4 + 0.029 L_{sum}) \text{ in which } L_{sum} = L^*_1 + L^*_2$$

$$H_{\Delta L} = 0.14 + 0.15 \tan h(-2 + 0.2\Delta L) \text{ in which } \Delta L = |L^*_1 - L^*_2|$$

$$H_H = H_{SY1} + H_{SY2}$$

$$H_{SY} = E_C(H_S + E_Y)$$

$$E_C = 0.5 + 0.5 \tan h(-2 + 0.5 C^*_{ab})$$

$$H_S = -0.08 - 0.14 \sin(h_{ab} + 50°) - 0.07 \sin(2h_{ab} + 90°)$$

$$E_Y = [(0.22L^* - 12.8)/10]\exp\{(90° - h_{ab})/10 - \exp[(90° - h_{ab})/10]\}$$

where $\Delta H^*_{ab}$ and $\Delta C^*_{ab}$ represent CIELAB colour difference in hue and chroma, respectively; $L^*$, $C^*_{ab}$ and $h_{ab}$ represent CIELAB lightness, chroma and hue angle, respectively (with subscripts 1 and 2 each used in the above variables to denote scores associated with the first and second colors respectively in the two color combination).

In example embodiments, for two non-adjacent colors, a color harmony value $CH_N$ is determined using the following equation:

$$CH_N = H_{C,N} \quad \text{Equation (14)}$$

in which:

$$H_{C,N} = 0.2 + 0.65 \tan h(1.7 - 0.045\Delta C_N)$$

$$\Delta C_N = [(\Delta H^*_{ab})^2 + (\Delta C^*_{ab}/1.30)^2]^{1/2}$$

where $\Delta H^*ab$ and $\Delta C^*ab$ are CIELAB colour difference values between the non-adjacent colors in hue and in chroma, respectively.

The color harmony values for the entire color combination can then be determined by averaging the CH scores for all color pairs (both adjacent and non-adjacent) as follows:

$$CH = \frac{1}{n}\left[\sum(CH_A) + \sum(CH_N)\right] \quad \text{Equation (15)}$$

where n is the total number of color pairs in a colour combination; and $CH_A$ and $CH_N$ are harmony scores for adjacent and nonadjacent colors, respectively.

Equation (13) for determining color harmony for two adjacent colors incorporates the following assumptions:

(a) Equal-hue and equal-chroma. Any two adjacent colors varying only in lightness tend to appear harmonious when combined together.

(b) High lightness. The higher the lightness value of each constituent colour in an adjacent color pair, the more likely it is that this pair will appear harmonious.

(c) Unequal lightness values. Small lightness variations (i.e. less than around 15 units of CIELAB colour difference) between the constituent colors in an adjacent colour pair may reduce the harmony of that pair.

(d) Hue effect. Among various hues, blue is the one most likely to create harmony in a two colour combination; red is the least likely to do so. In addition, bright yellows more often create harmony in an adjacent two-color combination than dark yellows. (e.g. khaki colors).

On the other hand, of the four color harmony principles described in the previous paragraph, only "(a) the equal-hue and equal-chroma principle" was found to play a significant role in the harmony of non-adjacent colors, which is incorporated into equation (14).

In alternative embodiments, color emotion scores and color harmony scores can be modeled using equations other than those discussed above, which are provided as one example of how human responses to colors can be modeled. For example, it will be noted that each of the above equations includes constants—in some embodiments the values used for the constants can vary from those stated above. For example, in at least some configurations for each of the models other than the "warm-cool" model, the constants in the above equations can vary from 50% to 150% of the values stated above. In at least some configurations for the "warm-cool" model, the constants in the above equations can vary from 50% to 110% of the values stated above. In other embodiments, different psychophysical perception models can be employed other than or in addition to those set out above.

As noted above, the models used to implement the color selection methods and devices described herein model human psychophysical perceptions of color emotion for colors and color combinations. Color harmony applies to a combination of colors, while the seven color emotions described above can apply to both individual colors and combinations of colors. In this regard, as used herein human psychophysical perception refers to a response of a human to a color or color combinations, as opposed to a more basic sensory perception such as a basic color perception. By way of example, perceiving that a color is "warm" or a color combination is "harmonious" is a reaction or feeling and hence a human psychophysical perception, whereas perceiving that a color is "green", or has a particular "hue" or "chroma" is a more basic sensory perception. By using mathematical models of human psychophysical perceptions that are based on response data gathered from a plurality of test subjects, the embodiments described herein simulate typical human reactions to colors and combinations of colors and use that information to assist users with color selection. Thus, in example embodiments the color selection methods and devices described herein can provide a virtual second opinion to the user's own feelings or color emotions, which may improve the user's color selection confidence especially in environments where users can be inundated with multiple colors in a short time period. Furthermore, in example embodiments the color selection methods and devices described herein can be used to filter the number of possible color selections presented to user and thereby reduce confusion at being presented with a myriad of color choices.

Color Library

The color library used in example embodiments of the invention will now be discussed in greater detail. In one example embodiment, the color library 62 is divided up into four different color groups (E1, E2, E3, E4) using the results of exciting-calming equation (1). Each color group which is associated with one of the four possible positions on the "Exciting-Calming" color scale 208 presented in the color group toolbar 205 of visual interface 200. In this regard Table 2 of FIG. 8A represents a portion of a color library file 62-1 for a group of colors (Color Group E1) that is associated with the left most button on "Exciting-Calming" color scale 208. As shown in FIG. 8A, the color library file 62-1 includes for each listed color: (a) a unique color code (in the column labelled "code"); (b) a color name; (c) the CIELAB values for the color, including the three CIELAB coordinates for the color (L* (lightness), a* and b*), as well as CIELAB values $C^*_{ab}$ (chroma) and $h_{ab}$ (hue angle). As well, an exciting-calming color emotion value E calculated using equation (1) is shown for each color in FIG. 8A, although that information could be omitted from the library file as it can be determined from the CIELAB values. Turning briefly again to FIG. 2, in the illustrated embodiment the color elements 211 displayed in the color group display region 202 are arranged in rows and columns—in at least one example embodiment, the color library file 62-1 includes information for each color identifying the location of that color in the array of color elements 211 (represented in FIG. 8A by the left-most column labelled "Row-Column"). In the illustrated embodiment, the each column represents a color page or paint strip that includes multiple colors arranged by color depth, and the colors included in each column have been manually selected. When classifying the library into color groups, the mean "exciting-calming" score for each color page or column is calculated, and the color columns are then assigned to a respective color group based on the mean "exciting-calming" score.

FIGS. 8B, 8C and 8D each show portions of respective color library files 62-2, 62-3 and 62-3, each of which represents a different group of colors falling within a unique range on the exciting-calming color emotion scale. Accordingly, color group E1 (library file 62-1) represents "very exciting" colors (in one illustrative example, group E1 includes 259 colors having a mean "exciting-calming" value of 0.78); color group E2 (library file 62-2) represents "slightly exciting" colors (in one illustrative example, group E2 includes 273 colors having a mean "exciting-calming" value of 0.15); color group E3 (library file 62-3) represents "slightly calming" colors (in one illustrative example, group E3 includes 249 colors having a mean "exciting-calming" value of −0.21); and color group E4 (library file 62-4) represents "very calming" colors (in one illustrative example, group E4 includes 189 colors having a mean "exciting-calming" value of −0.50). Although in the illustrated embodiment, the four color groups E1, E2, E3 and E4 are each specified in separate files of color library 62, in other embodiments they could be specified in a single file, and categorized into the respective color groups by the color selector application 60 based on their respective calming-exciting scores (or based on mean calming-exciting scores for sub-groups such as color columns).

Visual Interface

A. Color Group Display Region

Figure 9:
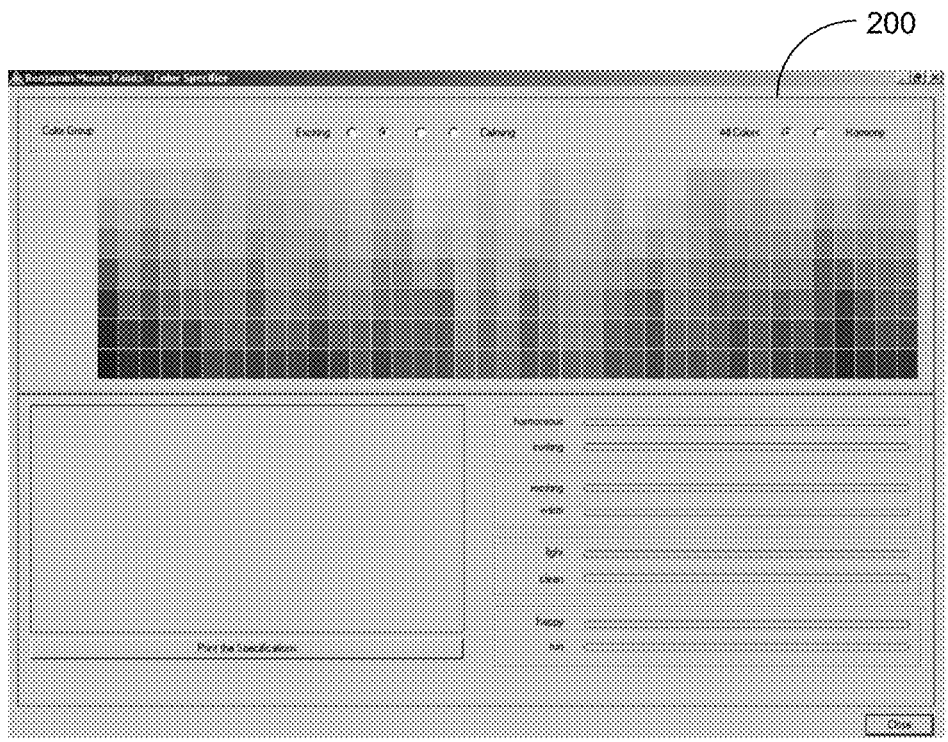
FIGS. 9, 10 and 11 each show the user interface of FIG. 2 displaying different color groups.
Figure 10:
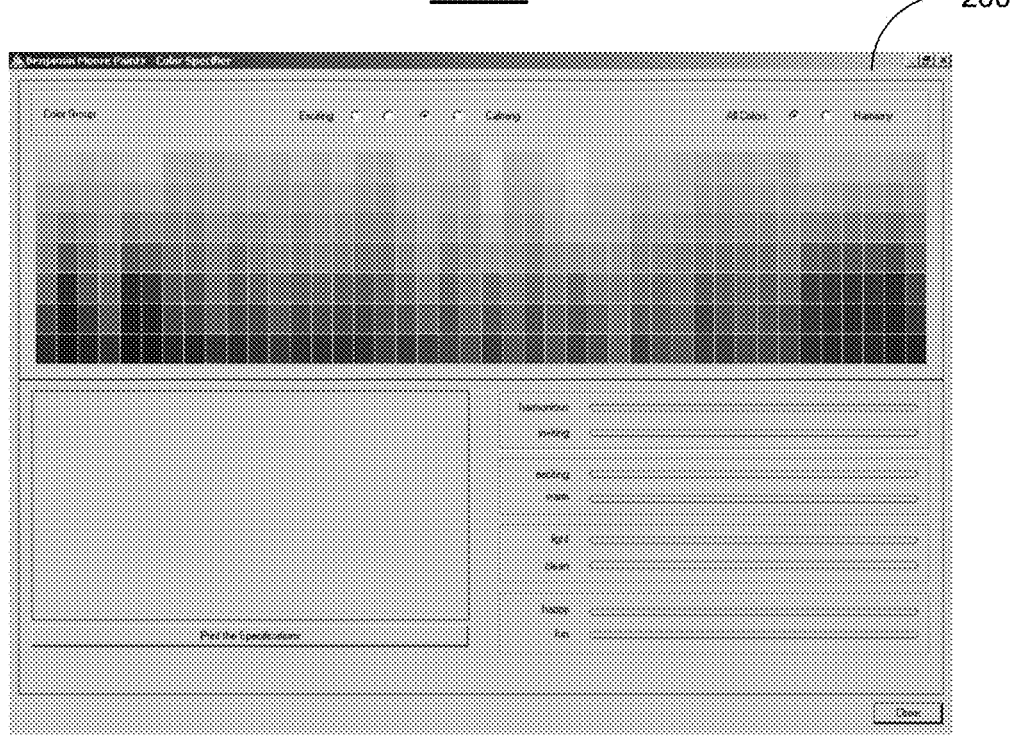
Figure 11:
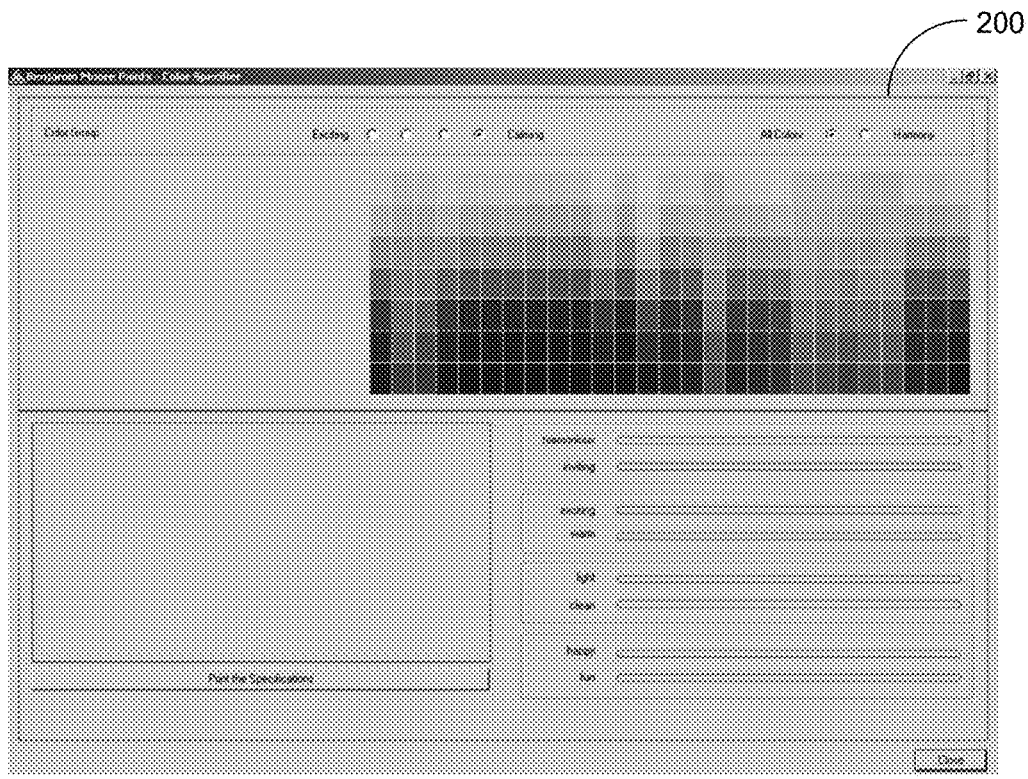

Turning again to the visual interface 200 of FIG. 2, in the illustrated embodiment, when the leftmost button on the "exciting-calming" scale 206 is selected, color elements 211 corresponding to the "very exciting" color group E1 (library file 62-1) are displayed in color group display region 202. When the second button on the "exciting-calming" scale 206 is selected, color elements 211 corresponding to the "slightly exciting" color group E2 (library file 62-2) are displayed in color group display region 202, as shown in FIG. 9. When the third button (i.e. second from the right) on the "exciting-calming" scale 206 is selected, color elements 211 corresponding to the "slightly calming" color group E3 (library file 62-3) are displayed in color group display region 202, as shown in FIG. 10. When the right-most button on the "exciting-calming" scale 206 is selected, color elements 211 corresponding to the "very calming" color group E4 (library file 62-4) are displayed in color group display region 202, as shown in FIG. 11.

Figure 12:
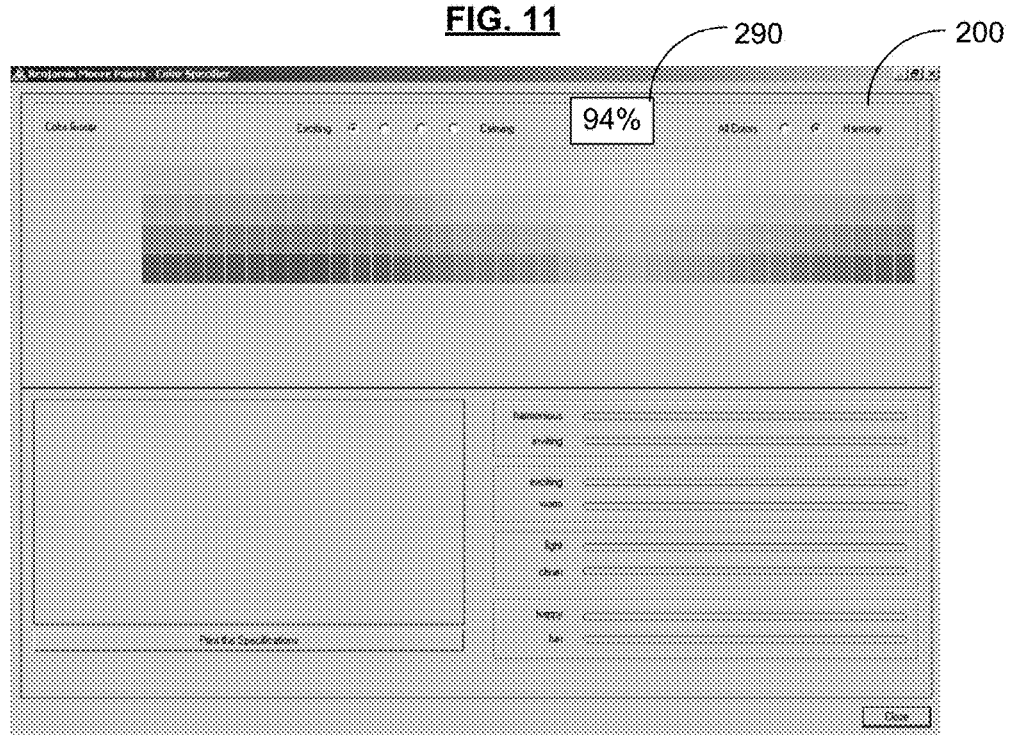
FIG. 12 shows the user interface of FIG. 2 displaying a harmony subgroup of a color group.

As noted previously, the color group displayed in the color group display region 202 can be further limited by selecting the "Harmony" mode option from the "All Colors" and "Harmony" choices 210. In Harmony mode, the colors displayed in the color group display region 202 are limited to the colors from the group that are determined to meet certain harmony thresholds. As apparent from harmony equation (13) above, when determining the harmony between a pair of colors, the "lightness sum" factor (i.e. $H_{Lsum}$) plays an important role in the determination of color harmony scores: the lighter the colors, the more likely it is for them to create harmony. In the illustrated embodiment, the color elements 211 are arranged vertically by color depth, and horizontally by hue. Accordingly, in order to limit the color group to colors that have a high likely hood of being harmonious, in one example embodiment the "darker" colors are dropped from the color group display region 202 in harmony mode. For example, in one embodiment, selecting the harmony button from options 210 results in the interface 200 being modified so that only the top four rows of the selected color group is displayed. FIG. 12 shows an example of the interface 200 in "Harmony" mode displaying the top four rows of color group E1. Similarly, when each of the color groups E2-E4 are respectively displayed in harmony mode, only their top four rows are shown in the color group display area 202.

One possible method for measuring the harmony of a group of colors is to use harmony equation (13) to calculate a harmony score for every possible color pair combination within the group, and then determine the percentage of color pair combinations in the group that have a positive harmony score. By way of illustrative example, using such a group harmony calculation method provides a color harmony score of approximately 88% for color group E1, 80% for color group E2, 77% for color group E3, and 61% for color group E4. When each of the four color groups are limited to their top four rows, the group harmony calculation provides a color harmony score of approximately 94% for color group E1, 97% for color group E2, 99% for color group E3, and 99% for color group E4. Accordingly, in the illustrated embodiment, selecting the harmony mode option from options 210 results in a displayed color group having a color harmony score of at least 94% or higher.

Although only two discrete choices 210 ("All Colors" or "Harmony") are shown in interface 200 of FIG. 2, the two discrete choices in tool bar 205 could be replaced with either a discrete scale with more than two options on the harmony scale, or a continuous sliding harmony scale (similar to scale 212), or a numeric pull down scale that allowed a user to select a desired color harmony level for the color group. Only the colors from the currently selected color group meeting the user selected color harmony level would then be displayed as color elements 211 in color group display area. For example, the user may specify that they only want to see colors from color group E1 having a color harmony score of 90% or higher, which would result in fewer group E1 colors being displayed in region 202 than are shown in FIG. 2, but more than are shown on FIG. 12. As shown in FIG. 2, in the illustrated embodiment, the color group tool bar 205 includes a color group harmony score indicator 290 that displays a representation of the color harmony score for the color group currently displayed in area 202.

Alternative methods can be used to determine a harmony score for a color group. For example, while the above-described color group harmony quantification method merely takes into account the number of positive harmony scores for every possible color pair combination within the color group, a weighted method could be used to take into account the magnitude of positive harmony scores in addition to the number of occurrence of positive harmony scores.

Thus, it will be appreciated that user interface 200 allows a user to filter the color elements 211 displayed in the working group region 202 based on desired levels for color perception characteristics that are inputted by the user (e.g. an exciting-calming level and/or a harmony level).

b. Working and Color Information Regions

Turning again to FIG. 2, as noted above users can select color elements 211 from the color group region 202, with selected color elements them being displayed as color candidate samples 228 in the working region 204 of interface 200. Under control of the color selection application 60, the controller 38 calculates color harmony and color emotion scores for the color candidate samples 228 in the working region 204 using the harmony and emotion modelling equations (1)-(15) discussed above. The results graphically are presented on the scales harmonious-unharmonious 212, inviting-uninviting 214, exciting-calming 216, warm-cool 218, light-dark 220, clean-dirty 222, happy-depressing 224, and fun-serious 226 of color information region 206. Although the scales shown in FIG. 2 are each represented as continuous horizontal bars that are filled in to represent the magnitude of the respective color harmony or color emotion score that they represent, the color harmony and color emotion information can be presented in alternative formats in different embodiments. By way of non-limiting example, actual numerical values can be presented, discrete scales can be used rather than continuous scales (for example, a discrete scale could look like scale 208), and/or vertical scales can be used instead of horizontal scales.

Each time the combination of colors candidate samples 228 in the working area 204 changes (for example through addition or removal by a user of a color candidate sample 228), the information displayed on the scales of region 206 is updated to reflect the current color combination. In an example embodiment, when just a single color candidate sample is in working area 204, the harmony scale 212 displays a null value, but the color emotion scales display the respective color emotion scores for the single color.

Figure 13:
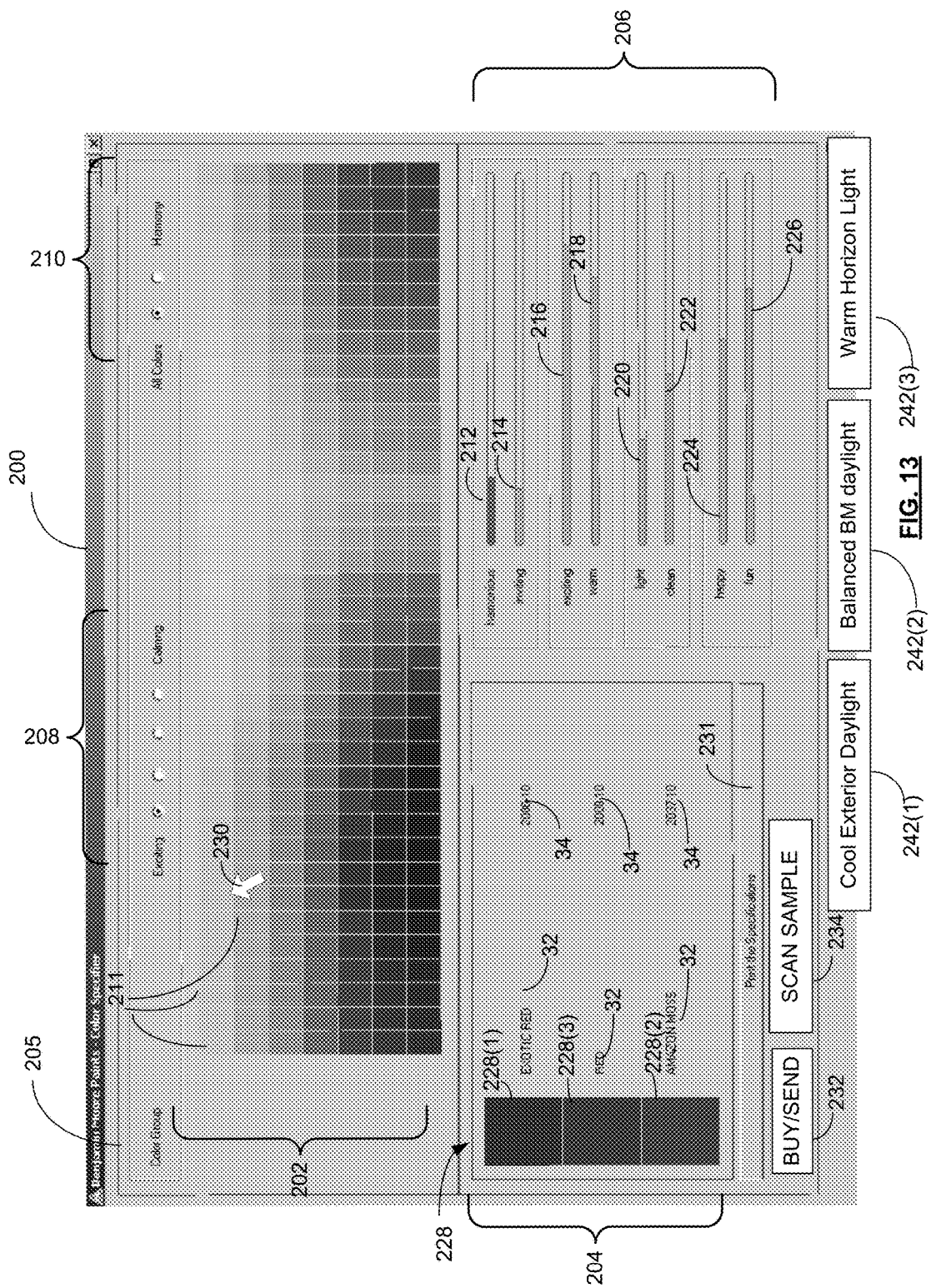
FIG. 13 shows another example of the user interface of FIG. 2.

As noted above, for most of the color emotion models, when multi-color combinations are considered it is not relevant if the candidate colors are adjacent to each other or not. However, at least in the case of the color harmony and the color emotion scale "inviting-uninviting", the scores determined for the color candidate combination are dependent on the relative orientation of the colors candidate samples. Accordingly, in example embodiments the relative positioning of the color candidate samples 228 in the working area 204 is taken into account when calculating the scores for the harmony scale 212 and the color emotion scale "inviting-uninviting" 214. By way of example, in the interface 200 as illustrated in FIG. 2, the color candidate sample 228(2) is adjacent both of the color candidates 228(1) and 228(3) which are non-adjacent each other, and this relative positioning is reflected in the harmony scale 212 and the color emotion scale "inviting-uninviting" 214. FIG. 13 shows interface 200 with the exact same color candidate samples from FIG. 2 in working space 204, however in this case the positions of color candidate samples 228(2) and 228(3) have been reversed, resulting in different scores on the harmony scale 212 and the color emotion scale "inviting-uninviting" 214, while the remaining color emotion scales 216-226 that are not dependant on the relative positioning of the colors stay the same. In example embodiments, a user can reposition the color candidate samples 228 within the working area 228.

In one example embodiment, the color selection device 10 is configured to generate an alert or indicator when selected color combinations in the working area 204 fall below predetermined color harmony threshold, which may be preset, or may be a user configurable value. By way of example, the bar used to represent the harmony scale 212 may change color depending on whether the calculated harmony score is above or below the threshold, with a green bar being used for above threshold color combinations and a red bar being used for below threshold color combinations. FIG. 13 illustrates a combination for which a color harmony alert has been generated in the from of a darker colored bar appearing on the harmony scale 212 than on the other scales (or on the harmony scale 212 shown in FIG. 2 for the same colors in a different order). The harmony alert could take different forms, including for example other or different visual and/or aural stimulation being issued by the color selection device 10. Furthermore, the color selection device 10 can also be configured to provide threshold alerts for all or selected ones of the color emotion scales shown in region 206 in the event that the corresponding color emotion scores fall below threshold levels. In at least some example embodiments, the scales for which alerts are provided and the thresholds for determining an alert are user configurable with default values set by a designer involved in configuration of the color selection application 60.

As indicated in FIG. 13, in one example embodiment, the interface 200 includes a "print" option button 231 that a user can select to print out the color candidate samples 228, color names 32 and color IDs 32 contained in working area 204. In some embodiments, a "buy/send" option button 232 is provided such that when the "buy/send" button is selected by a user the device 10 exports information (such as color ID's 32) on the color candidate samples 228 over network 90 to a Web-based store front hosted at server 80 or another server so that the user can purchase paints or surface coverings that correspond to the color candidate samples. In the case of a store-located color selection device 10, selecting the "buy/send" option may just send the color candidate information through a local area network to a computer at a paint mixing station. In some embodiments, a "Scan Sample" option button 234 is provided that links to an interface that allows a user to scan a color element using color scanner 40, and have a representation of that color element appear as a color element 228 in working area 204 so that the user can then get feedback as to what color elements 211 from color group region 202 work with the user supplied sample from a color harmony and color emotion perspective. Thus a user could for example be aided in selecting paint colors to go with a particular fabric color that they scan into the color selector system 10. Color scanner 40 may include, among other things, a spectrophotometer, a camera, or another type of CIE compliant color measuring device.

Figure 14A:
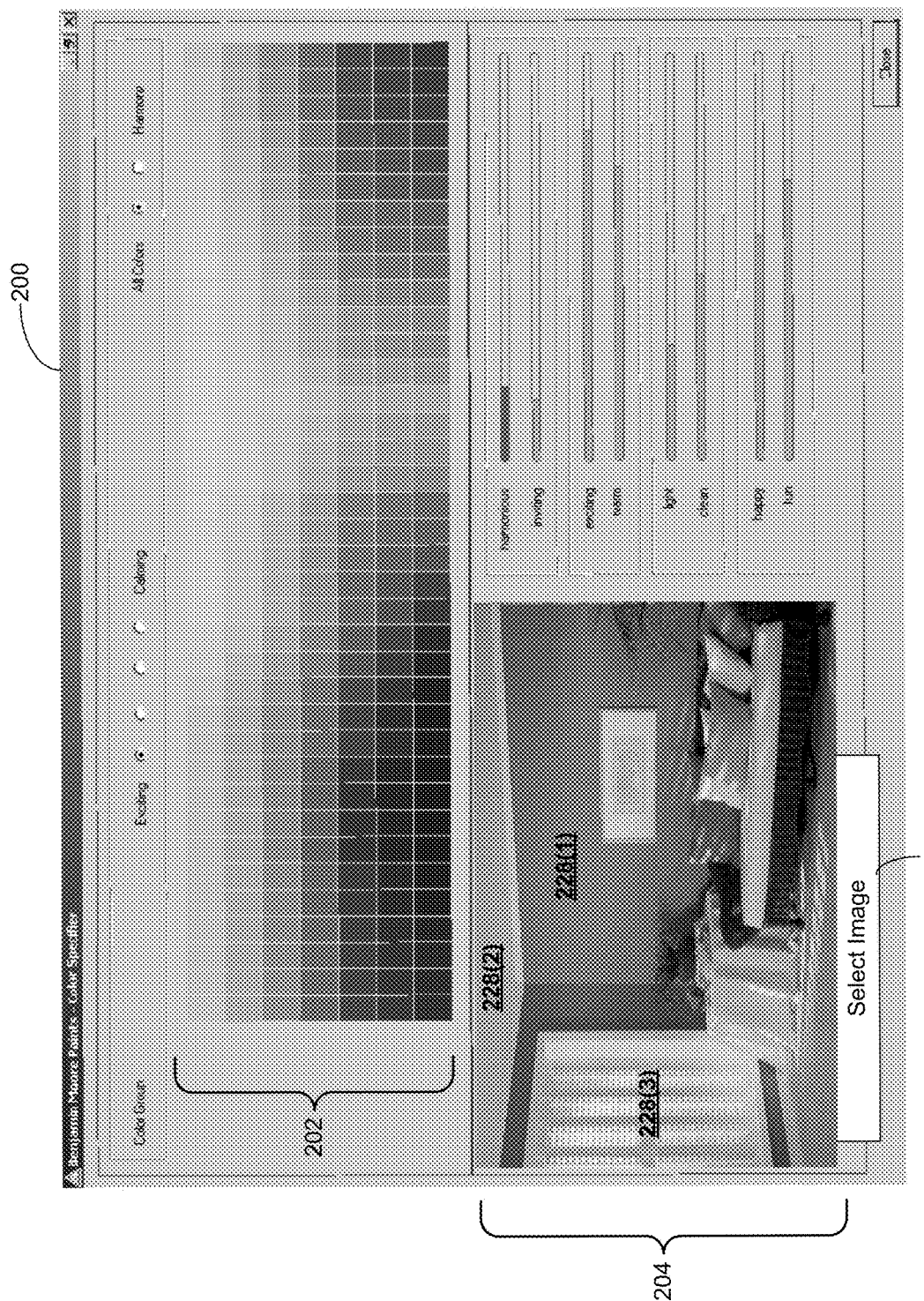
FIGS. 14A, 14B and 14C shows other examples of a user interface, similar to the interface of FIG. 2.

In some example embodiments, the working area 204 can display the selected or scanned color candidate samples 228 in images that simulate actual environments in which the colors would be applied—for example in FIG. 14A the color candidates 228(1), 228(2) and 228(3) are shown in working area 204 applied to respective surfaces in an image that represents an interior image of a house. In at least some example embodiments, the interface includes a "select image" option button 240 that allows the user to browse and select a background image for the working area 204. Color elements can then be selected from color group area 202 for the selected image. The user selectable images could for example come from a pre-defined library of images provided with the color selection application 60, or may be a user supplied image—for example an image from a picture that the user has taken of the interior or exterior or his or her home.

Figure 14B:
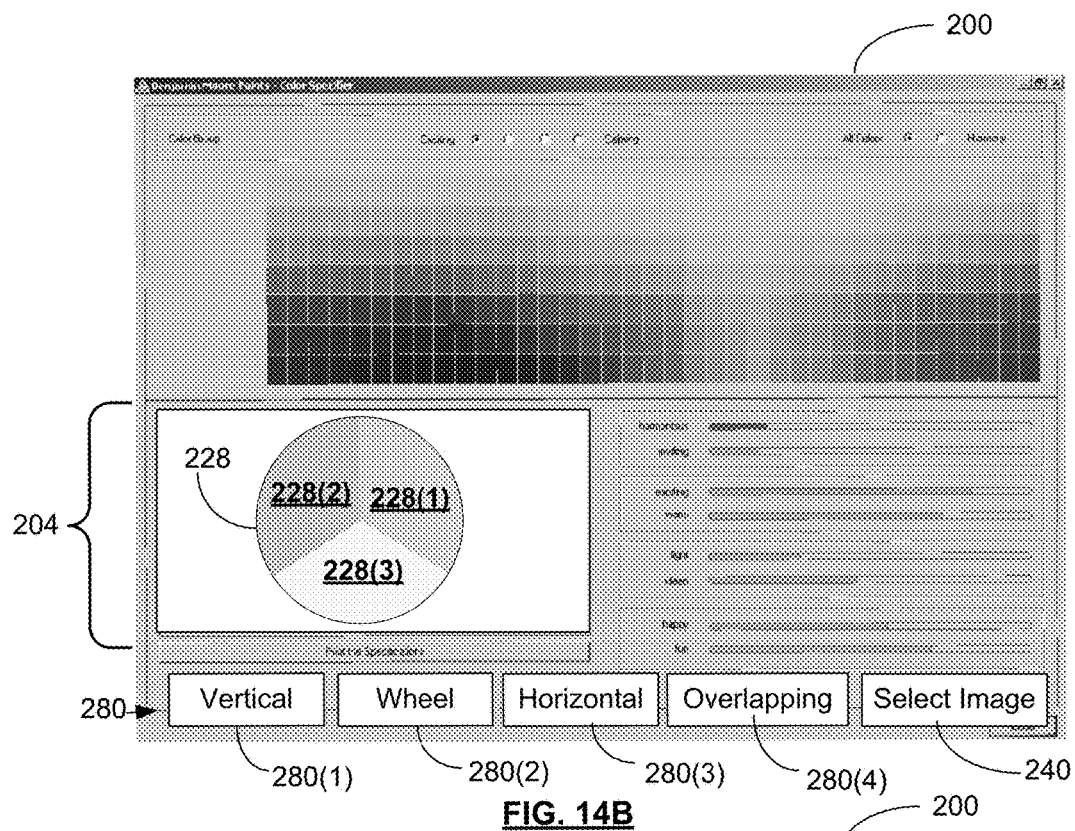
Figure 14C:
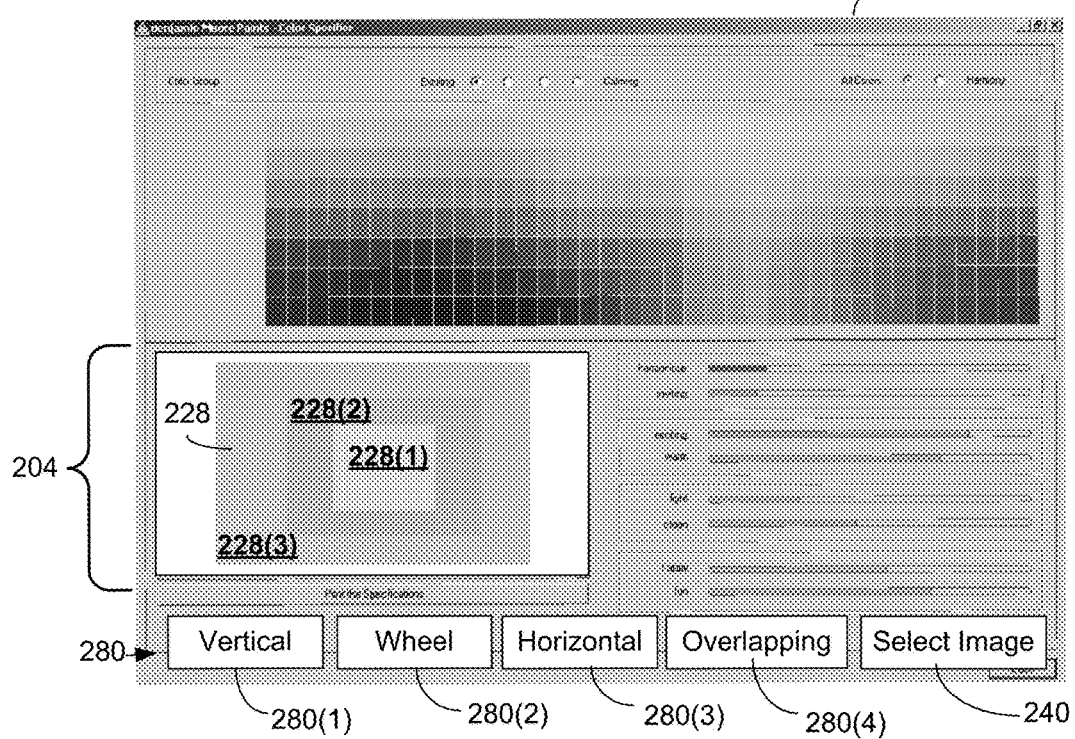

FIGS. 14B and 14C represent an example embodiment in which user interface 200 is configured to allow the user to select different options for displaying color candidate samples 228 in the working area 204. In particular, FIGS. 14B and 14C show a working area toolbar 280 integrated into the interface 200 that allows user selectable options of "vertical"280(1); "wheel" 280(2); "horizontal" 280(3); and "overlapping" 280(4). Such options can be presented in a variety of different ways, including for example in as buttons in a toolbar row as shown in FIGS. 14B and 14C, or in a drop down menu, etc. In some embodiments, the "select image" option 240 discussed above can be part of toolbar 280. Selection of the "vertical" option 280(1) causes the candidate color elements 228 to be displayed in a vertical column as shown in FIG. 2 for example. Selection of the "horizontal" option 280(3) causes the color candidate samples 228 to be presented side-by-side in a row (i.e. perpendicular relative what is shown in the working area 204 of FIG. 2). Selection of the "wheel" option 280(2) causes the candidate color options 228 to be displayed in a color wheel as shown in FIG. 14B. It will be appreciated that in a three-color wheel all colors are adjacent each other which can cause a difference in the color "harmony" score and the color emotion "inviting-uniniviting" scores than when the color candidate samples 128 are displayed with non-adjacent colors as shown in FIGS. 2, 14A and 14B.

Selection of the "overlapping" option causes the color candidate samples 228 to be presented in a layered or overlapping fashion as shown in FIG. 14C. In some example embodiments, users can drag and drop the color candidate samples 228 in working area 204 to reorganize them.

Figure 15:
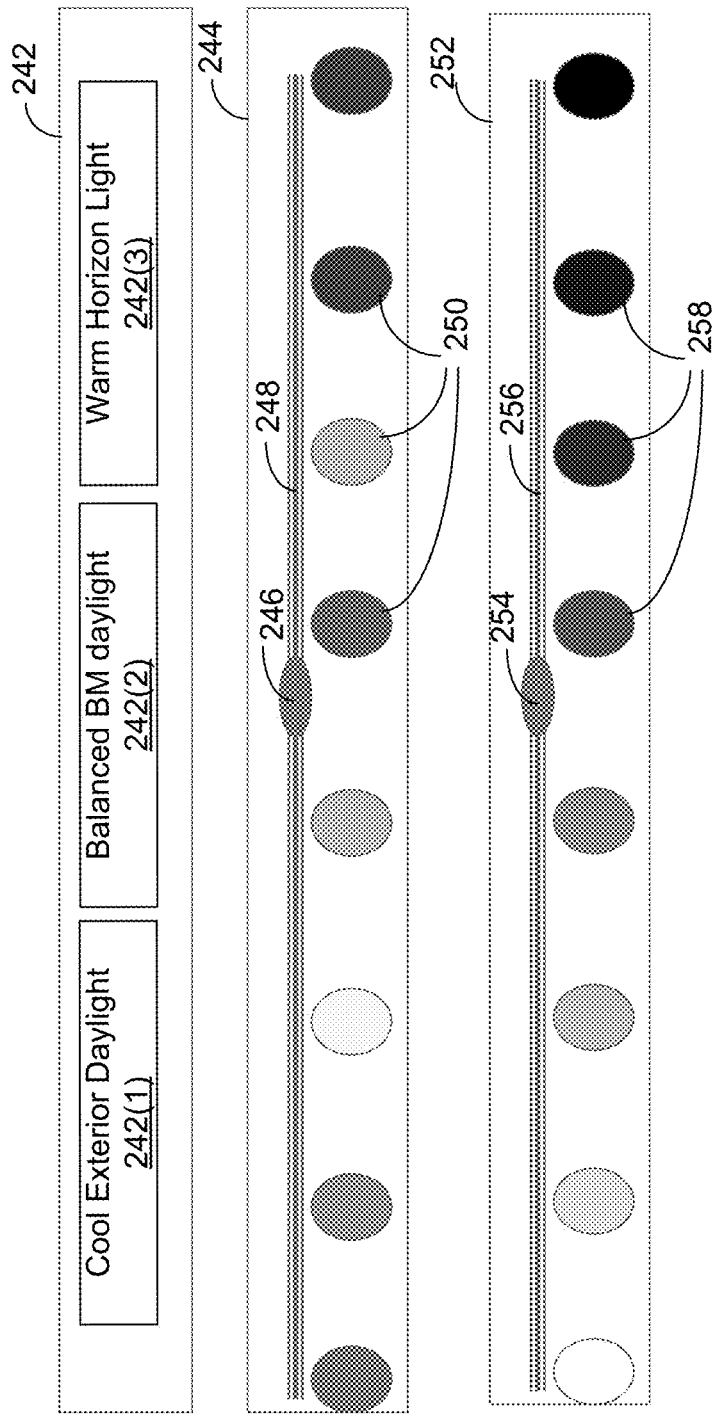
FIG. 15 shows examples of various user selectable options that can be incorporated into the interface of FIG. 2.

FIG. 15 illustrates different user selectable options that can be incorporated into the user interface 200 of any of the previous Figures in different example embodiments. As known in the art, the CIELAB values for representing colors inherently assume certain defined viewing conditions or perceptual attributes including lighting conditions. In at least some example embodiments the user interface 200 includes options that allow a user to modify one or more perceptual attributes of the colors included in the color library 62. By way of example, FIG. 15 includes a lighting options toolbar 242 (also shown in FIG. 13) that can be incorporated into interface 200 and which includes user selectable buttons 242(1), 242(2) and 242(3) for selecting different simulated lighting options for adapting the colors to different lighting conditions, including for example a "Cool Exterior Daylight" option, a "Balanced BM (Benjamin Moore) Daylight option and a "Warm Horizon Light" option. Each of the lighting options is associated with one or more adaptation values (for example a different spectral lighting distribution value) that causes a corresponding change in the color elements 211 and candidate color elements 228 displayed in the color group display region 202 and working region 204, respectively, as well as in the color harmony and color emotion scores displayed in region 206.

In making such adaptations, the color selection application 60 may, for example, apply equations associated with color appearance models such as those defined by CIECAM97 and CIECAM 02 that allow CIELAB color values to be correlated to different perceptual attributes. Thus, the "lighting options" toolbar 242 allows users to see a representation of how colors would appear across a range of different lighting conditions, with the added benefit of viewing color harmony and color emotion scores across the different lighting conditions. In addition to different perceived lighting conditions, other or additional tool bars could also be used in interface 200 to allow users to selectively choose variation in other perceptual attributes, including for example brightness, lightness, chroma, saturation, colorfulness and hue.

FIG. 15 also shows a hue range selection toolbar 244 having a user movable button 246 on a sliding scale 248 that allows a user to specify a desired hue range with reference to visual hue color indicators 250. In an example embodiment, the colors of a color group shown in color group region 202 will be limited to those falling within the user selected hue range. Hue range selection can also be provided through selection options other than a sliding scale, for example with a discrete scale or a numeric pull-down scale.

FIG. 15 also shows a desired color depth selection toolbar 252 having a user movable button 254 on a sliding scale 256 that allows a user to specify a desired color depth hue range with reference to grey scale indicators 258. In an example embodiment, the colors of a color group shown in color group region 202 will be limited to those satisfying the desired color depth range. Color depth range selection can also be provided through selection options other than a sliding scale, for example with a discrete scale or a numeric pull-down scale. (Note: the color depth parameter for interface 200 can be replaced by the lightness parameter to generate a new set of color effects because of their color quality difference. Lightness is an attribute of color by which a color is perceived to be lighter or darker relative to a gray scale from white to black. Color depth is an attribute of color by which a color is perceived to be heavier or lighter dependent on the colorant concentration loading to the substrate. The later term is usually related to both the lightness and chroma of the color.)

Figure 16:
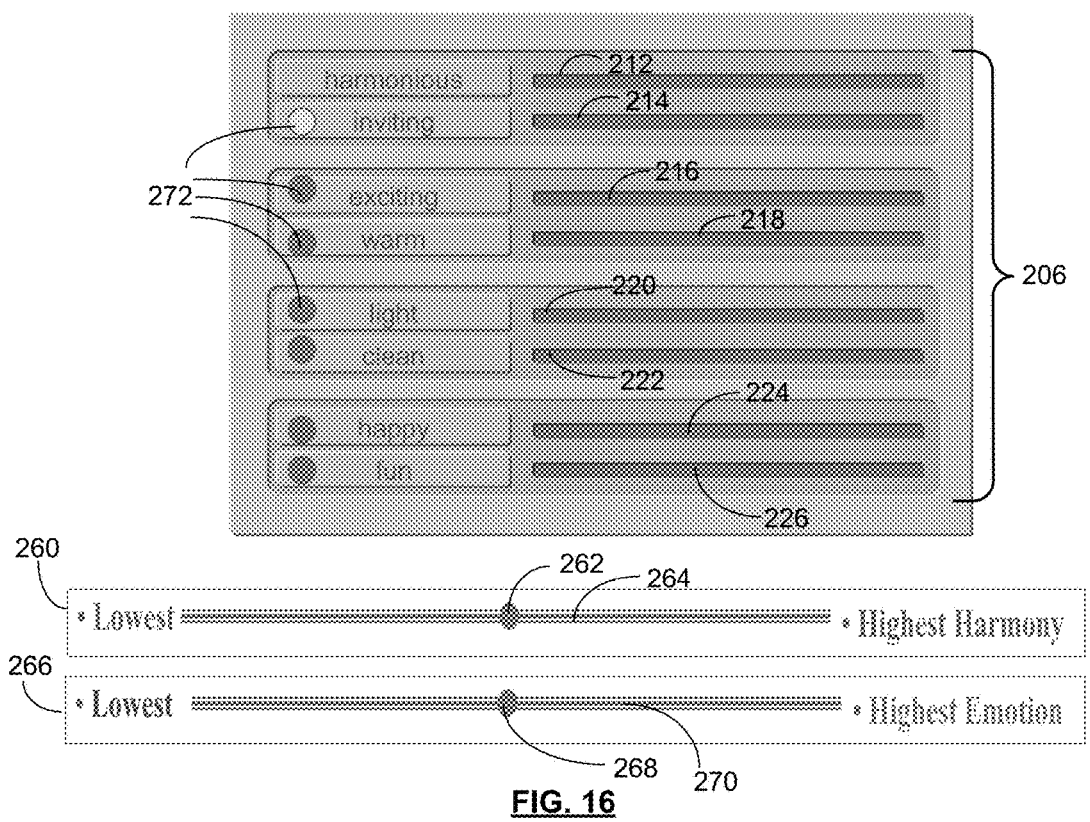
FIG. 16 illustrates additional user selectable options that can be incorporated into the interface of FIG. 2.

FIG. 16 shows a modified version of color information region 206, along with a color harmony selection tool bar 260 and a color emotion selection toolbar 266 that can be incorporated into the user interface 200 of any of the previous figures with or without the toolbar options shown in FIG. 15. Furthermore, the color harmony selection tool bar 260 and the color emotion selection toolbar 266 can each be incorporated into the user interface 200 either together, or exclusive of each other, in different embodiments. As noted above, in one embodiment the binary user selectable options of "All Colors" and "Harmony" 210 in color group toolbar 205 can be replaced with a harmony option allowing more than two selections, and the color harmony selection tool bar 260 is an example of such an alternative. In one example embodiment, the color harmony tool bar 260 includes a button 262 movable along a continuous scale 264 between a position representing "Lowest Harmony" and a position representing "Highest Harmony". The colors represented in the color group display region 202 of interface 200 will be limited only to colors within the selected color group that meet the desired harmony level. In place of a continuous sliding scale, other harmony level selection options can be used, including for example discrete scale or a numeric pull-down scale.

The color emotion tool bar 266 is provided to allow a user to specify a desired color emotion level for color emotions that correspond to one or more of the color emotion scales 214-226, and includes a button 268 movable along a continuous scale 270 between a position representing "Lowest Emotion" and a position representing "Highest Emotion". In one example embodiment, a user selectable button 272 is displayed beside each of the color emotion scales 214-226, and in order to use the desired color emotion level for a specific color emotion, the user selects the button 272 associated with that specific color emotion, and then slides the selection button 268 to a desired location on the scale 270. In the illustrated example embodiment, the central position on the scale 270 represents the neutral default position that will encompass the greatest number of colors. Thus, by using the color emotion tool bar 266 in combination emotion selection buttons 272 a user can selectively specify desired color emotion levels for one or more of the color emotion scales, and the colors of the selected color group currently displayed in region 202 will be limited to the colors that meet the specified color emotion levels. It will be appreciated that several different alternative interface configurations could be used for setting the color emotion levels, including for example a discrete scale, and a numeric pull down scale. Furthermore, individual tool bars 266 could be simultaneously displayed for each of the color emotions parallel to the feedback scales 214-226, rather than having the color emotions all share a single color emotion tool bar 266.

In embodiments where the color emotion tool bar 266 is combined with the color harmony tool bar 260, the colors displayed in region 202 will be limited to those colors that meet both the desired harmony and color emotion levels. Furthermore, in embodiments where hue range selection toolbar 244 and/or the desired color depth selection toolbar 252 are also part of the interface 200, the colors displayed in region 202 will also have to meet the criteria levels specified by such additional toolbars. Accordingly, in example embodiments, the colors samples 211 of a color group that are displayed in color group display region 202 can be selectively filtered in dependence on: the group color harmony score of the displayed group; the "inviting-calming" color emotion score for each color in the displayed group; the "exciting-calming" color emotion score for each color in the displayed group; the "warm-cool" color emotion score for each color in the displayed group; the "light-dark" color emotion score for each color in the displayed group; the "clean-dirty" color emotion score for each color in the displayed group; the "happy-depressing" color emotion score for each color in the displayed group; and the "fun-serious" color emotion score for each color in the displayed group; and combinations of the forgoing.

In the above described embodiment, the color elements 211 displayed in color group region 202 as filtered according levels specified through color harmony tool bar 260 and/or color emotion tool bar 266 are determined a presented without regard to what user selected color candidate samples 228 are presently in working region 204. However, in some example embodiments, once one or more user selected color candidate samples 228 are located in working area 204, the color elements 211 that are shown in color group area 202 are determined based on which colors meet the harmony and/or color emotion levels specified through color harmony tool bar 260 and/or color emotion tool bar 266 when combined with the current user selected candidate color element or samples 228. Thus, in such embodiments, a user can select one or more color elements 211 as color candidate samples 228, then specify a desired color harmony or color emotion level(s), and then be presented in color group region 202 with the subset of colors from the existing color group that will meet the user specified desired color harmony or color emotion level(s) when combined with the already selected candidate color element or samples 228. In effect the color selection device 10 suggests colors to the user to combine with colors the user has already selected, and such suggestions are based on quantitative models derived from the reactions of actual test subjects to colors and color combinations. It should be noted that the color elements 228 can also be derived from color elements scanned in by a user from outside of the color library 62, so the user can be provided with color suggestions that meet specified harmony levels and/or color emotion levels when combined with the user supplied color element.

Figure 17:
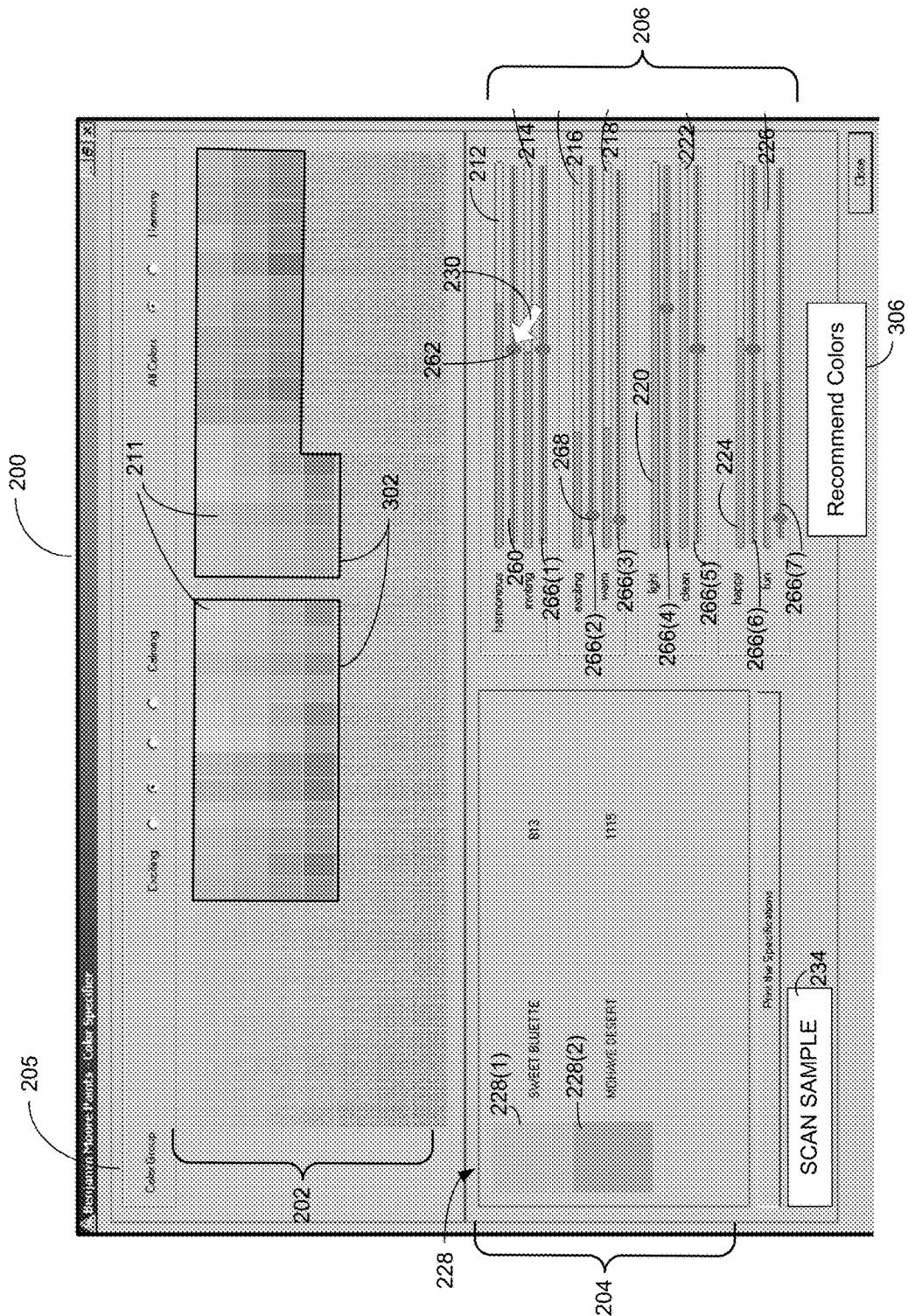
FIG. 17 illustrates another example of color selection user interface similar to that of FIG. 2.

FIG. 17 further illustrates an example embodiment in which user interface 200 of the color selection device 10 can recommend selected colors from a color group to a user of the color selection device 10. The user interface 200 of FIG. 17 varies from the configuration suggested in FIG. 16 in that in FIG. 17 a separate user input sliding tool bar is provided for each of the respective color harmony and color emotion scales so that the user can immediately see the desired color harmony and color emotion score thresholds that they have selected as well as the color harmony and color emotion scores of the color candidate samples 228 currently in working area 204. Thus, as shown in FIG. 17, color harmony tool bar 260 is provided adjacent the color harmony scale 212, and tool bars 266(1)-266(7) are provided adjacent each of the respective color emotion scales 214-226. By manipulating on screen marker 230, a user can slide the color harmony selection button 262 along the toolbar 260 to set a minimum desired color harmony threshold score. Similarly, the respective selection buttons 268 provided on each of the color emotion tool bars 266(1)-266(7) can be slid by a user to set a minimum desired color harmony score for each of the "inviting-calming" color emotion, the "exciting-calming" color emotion, the "warm-cool" color emotion, the "light-dark" color emotion, the "clean-dirty" color emotion, the "happy-depressing" color emotion, and the "fun-serious" color emotion. Based on the color candidate sample(s) 228 currently located in working area 204, and on the color harmony and color emotion score thresholds set using tool bars 260 and 266(1)-266(7), and using the color harmony and color emotion equations discussed above, the color selection application 60 determines which color elements 211 from the color group displayed in the color group display area 202 meet the minimum color harmony and color emotion score thresholds when combined with the color candidate sample(s) 228, and then modifies the color group display region 202 to identify as a suggested color group subset 302 the color elements 211 that meet the criteria. The user can then select color elements 211 from the suggested color group subset 302 to add to working area 204 and be provided with feedback on scales 212-226 about how the selected color combination measures up against the user selected thresholds. In some example embodiments, interface 200 is provided with a user selectable button (for example a "Recommend Colors" button 306) that the user can use to trigger the device 10 to determine what colors meet the user specified human perception criteria levels. In either D65, A, F2, TL 84 or other predefined light source) or reflectance data (R %). In such cases, the different color data format can either be converted to CIELAB formant and then used in the above equations, or alternatively the equations modified for the different format. By way of example, in one embodiment a dynamic link library (DLL) is used to calculate specific color emotion (CE) or color harmony (CH) values as shown in FIG. 19.

In some example embodiments, discrete scales are used to represent color harmony and color emotion values, for example using the numbers 1 to 10 represent discrete degrees for each scale; 10 means highest degree for the first term in each word pair, i.e. "light", "warm", "exciting", "fun", "happy", "clean", "inviting" and "harmonious"; 1 means highest degree for the second term, i.e. "dark", "cool", "calming", "serious", "depressing", "dirty", "uninviting" and "disharmonious". Table 6 below shows cell values that define the range of CE or CH values that correspond to a discrete degree shown in the left column.

TABLE 6

Determination of discrete scales for CEs and CH

|  | dark-light | warm-cool | exciting-calming | fun-serious | happy-depressing | clean-dirty | inviting-uninviting | harmonious-disharmonious |
|---|---|---|---|---|---|---|---|---|
| 1 | <−1.23 | <−1.04 | <−0.23 | <−1.12 | <−0.85 | <−1.28 | <−0.72 | <−0.98 |
| 2 | −1.23~−0.85 | −1.04~−0.72 | −0.23~0.18 | −1.12~−0.60 | −0.85~−0.52 | −1.28~−0.91 | −0.72~−0.29 | −0.98~−0.71 |
| 3 | −0.85~−0.48 | −0.72~−0.40 | 0.18~0.58 | −0.60~−0.09 | −0.52~−0.18 | −0.91~−0.54 | −0.29~0.15 | −0.71~−0.45 |
| 4 | −0.48~−0.10 | −0.40~−0.07 | 0.58~0.98 | −0.09~0.42 | −0.18~0.15 | −0.54~−0.17 | 0.15~0.58 | −0.45~−0.19 |
| 5 | −0.10~0.28 | −0.07~0.25 | 0.98~1.39 | 0.42~0.93 | 0.15~0.49 | −0.17~0.21 | 0.58~1.01 | −0.19~0.08 |
| 6 | 0.28~0.65 | 0.25~0.57 | 1.39~1.79 | 0.93~1.45 | 0.49~0.83 | 0.21~0.58 | 1.01~1.45 | 0.08~0.34 |
| 7 | 0.65~1.03 | 0.57~0.89 | 1.79~2.19 | 1.45~1.96 | 0.83~1.16 | 0.58~0.95 | 1.45~1.88 | 0.34~0.60 |
| 8 | 1.03~1.40 | 0.89~1.21 | 2.19~2.59 | 1.96~2.47 | 1.16~1.50 | 0.95~1.32 | 1.88~2.31 | 0.60~0.86 |
| 9 | 1.40~1.78 | 1.21~1.53 | 2.59~3.00 | 2.47~2.98 | 1.50~1.84 | 1.32~1.69 | 2.31~2.75 | 0.86~1.13 |
| 10 | >1.78 | >1.53 | >3.00 | >2.98 | >1.84 | >1.69 | >2.75 | >1.13 | such an embodiment, once the user sets scales 260 and 266(1)-266(7) to the desired level and then selects the "recommend colors" button 306 the color selection application 60 determines which color elements 211 meet the specified criteria and modifies display region 202 accordingly.

In the example embodiment illustrated in FIG. 17, the suggested color group subset 302 is highlighted relative to the color elements that did not meet the set criteria in that color elements that did not meet the criteria are faded or visually muted or at least partially obscured. In some embodiments, such "rejected" color elements that are not part of the suggested color group subset 302 could be completely removed from the color group display region 202 or distinguished in another manner.

This, in the embodiments of FIGS. 16 and 17, the color selection device 10 can filter the color elements 211 presented in the color group display region 202 to identify only those color elements 211 that can be combined with previously selected candidate color elements 228 to achieve a user specified color harmony level and/or one or more user specified color emotion levels.

Figure 18:
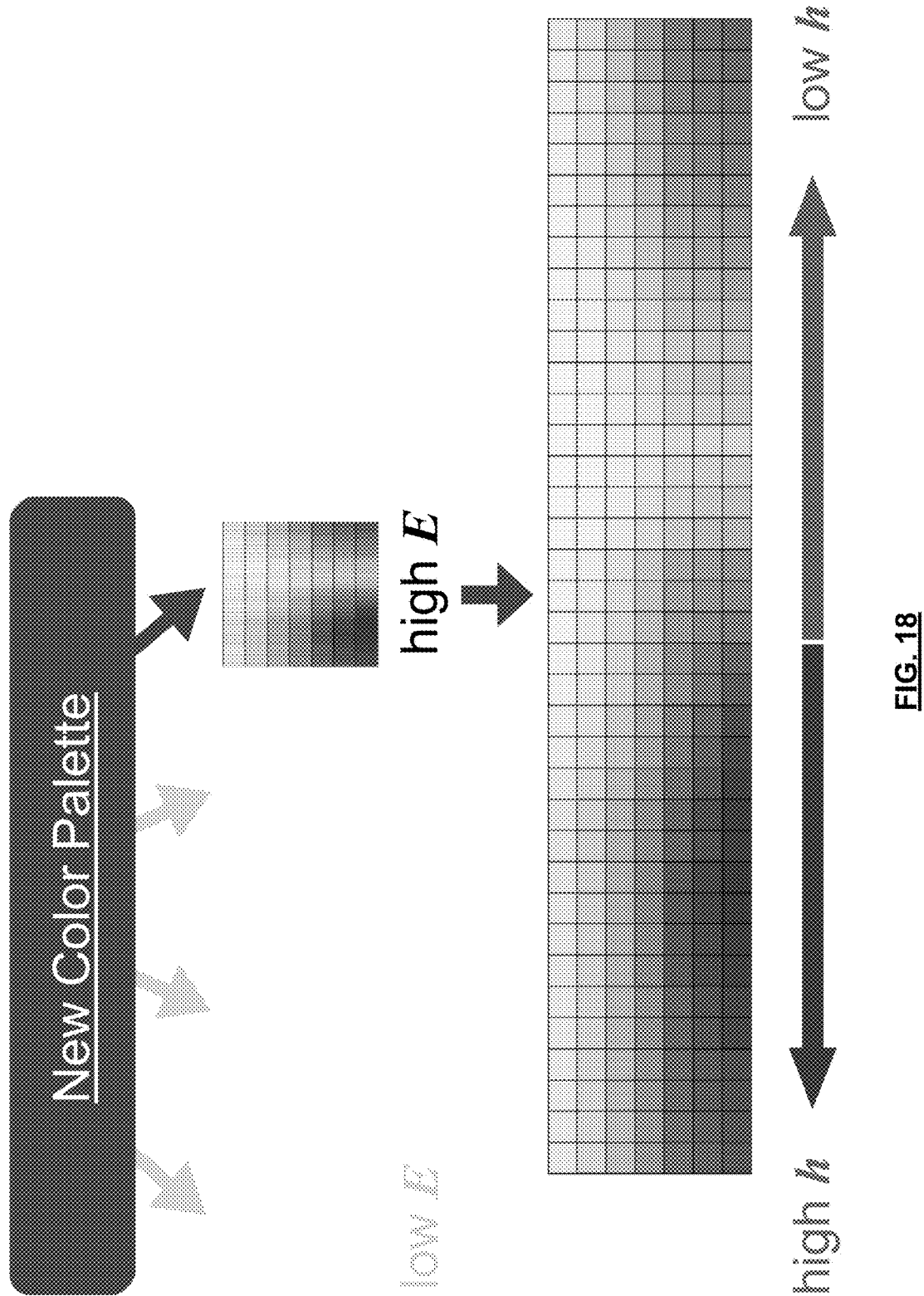
FIG. 18 illustrates a new color library sorting function.

In some embodiments the color selection application 60 allows users to import a new color library 62, and sorts the colors into respective color groups (eg. into color groups E1, E2, E3 and E4) based, for example, on where the colors fall within the Exciting-Calming scale and the hue and lightness of the colors, as represented in FIG. 18.

In at least some example embodiments, the color data specified in color library 62 may take a form other than CIELAB data, including for example XYZ data (under In example embodiments the color selection system embodiments described herein may be used to assist people with paint selection, however it can also be applied to other areas where color coordination is of value, such as in selecting fabrics for furniture, wall covering colors, broadloom colors, and appliance colors, to name but a few possible applications.

In at least one example embodiment, the color selection device 10 is configured as a handheld electronic device having a housing that holds the display 22, storage samples 24, 26, controller 38, a user input device 28, and a color scanner 40 (for example a spectrophotometer). Using such a compact mobile device a designer or other device user can easily scan and input colors at various locations and immediately combine the scanned colors as color candidate samples 228 with either other scanned colors or with colors selected from color library 62 and receive color harmony and color emotion scores and/or suggestions as to what colors from the color library 62 can be combined with the scanned color(s) to achieve desired color harmony or color emotion values. In at least one example embodiment, user input to the device 10 is carried out through voice commands.

As suggested above, in at least some example embodiments, the color selection application 60 could be a web based application hosted at color selection server 80 such that user inputs from a remote user color selection device 10 would be received at color selection server 80 through network 90, and color emotion and color harmony information (and other information contained din interface 200)

determined at server 80, and then sent back though network 90 for presentation to the user at device 10.

In some example embodiments some or all of the color emotion and color harmony scores for colors and color combinations may be predetermined and stored in look-up-tables that are part of or associated with color library 62.

In some example embodiments described above, color harmony scores and at least one color emotion score can be dependent on the relative positioning of colors in a color combination. In further example embodiments, the relative proportionality of color candidate samples 228 can also affect color harmony (and in some cases, color emotion) values. In one example embodiment, the relative size or proportions of candidate color elements in working area 204 can be specified by a user, and this information taken into account when determining color harmony (and in some cases color emotion). For example, in one example embodiment, navigation tool 230 can be used by a user to adjust the relative sizes of the color boxes shown in area 204 of FIG. 14C, or the relative sizes of the different colored surfaces in area 204 of FIG. 14A, and the proportionality of the color samples then used when determining color harmony for the combination. A model for taking proportionality into account when determining color harmony is shown for example in (6) Wang, X., Ou, L., Luo, M. R., "Influence of Area Proportion on Colour Harmony", International Conference on Color Harmony, Budapest Hungary, Apr. 24-26, 2007, which is incorporated herein by reference. As indicated in the above paper, a three color harmony model considering area proportions (a:b:c) can be represented as follows:

$$CH_{(a:b:c)} = -0.96 + 1/(a+b+c)[(a+b)CH_{ab} + (b+c)CH_{bc} + (c+a)CH_{ca}]$$

In which a, b, and c represent areas of three constituent colors in a combination; $CH_{ab}$, $CH_{bc}$ and $CH_{ca}$ represent harmony values for "sub-combinations" of constituent colors a and b, b and c and c and a, respectively and are determined by the following:

$$CH_{ij} = \frac{1}{2}H_c + H_L$$

where $$H_C = 0.04 + 0.53 \tan h(0.8 - 0.045\Delta C)$$

$$\Delta C = [(\Delta H^*_{ab})^2 + (\Delta C^*_{ab}/0.5)^2]^{1/2}$$

$$HL = H_{Lsum} + H_{\Delta L}$$

$$H_{Lsum} = 0.28 + 0.54 \tan h(-3.88 + 0.029 L_{sum}) \text{ in which } L_{sum} = L^*_1 + L^*_2$$

$$H_{\Delta L} = 0.14 + 0.15 \tan h(-2 + 0.2\Delta L) \text{ in which } \Delta L = IL^*_1 + L^*_2 I$$

where $L^*$, $C^*_{ab}$ and $h_{ab}$ are CIELAB values for lightness, chroma and hue angles, respectively; $\Delta L$, $\Delta C^*_{ab}$ and $\Delta H^*_{ab}$ represent CIELAB color difference values in lightness, chroma and hue, respectively.

In at least some example embodiments, user information and/or information about user interaction with interface 200 is gathered at a server such as color selection server 80 and analyzed to gather information about colors selected as color candidate elements by users and to track other user interaction details.

Tangible Color Displays Based on Color Emotions and/or Color Harmony

As discussed above, color library 62 can be divided up into four different color groups (E1, E2, E3, E4) using the results of exciting-calming equation (1). Each color group is associated with one of the four possible positions on the "Exciting-Calming" color scale 208 presented in the color group toolbar 205 of visual interface 200, illustrated in FIG. 2. The present invention is not limited to four groups of exciting-calming emotion. Since each color has an exciting-calming value according to equation (1), any number of color groups E# can be arranged. FIG. 2 shows in first color display region 202 color group E1 and FIG. 8A shows the specifications of the E1 colors, including the L*, a*, b*, $C^*_{ab}$ and $h_{ab}$ coordinates and exciting-calming E values.

Figure 20A:
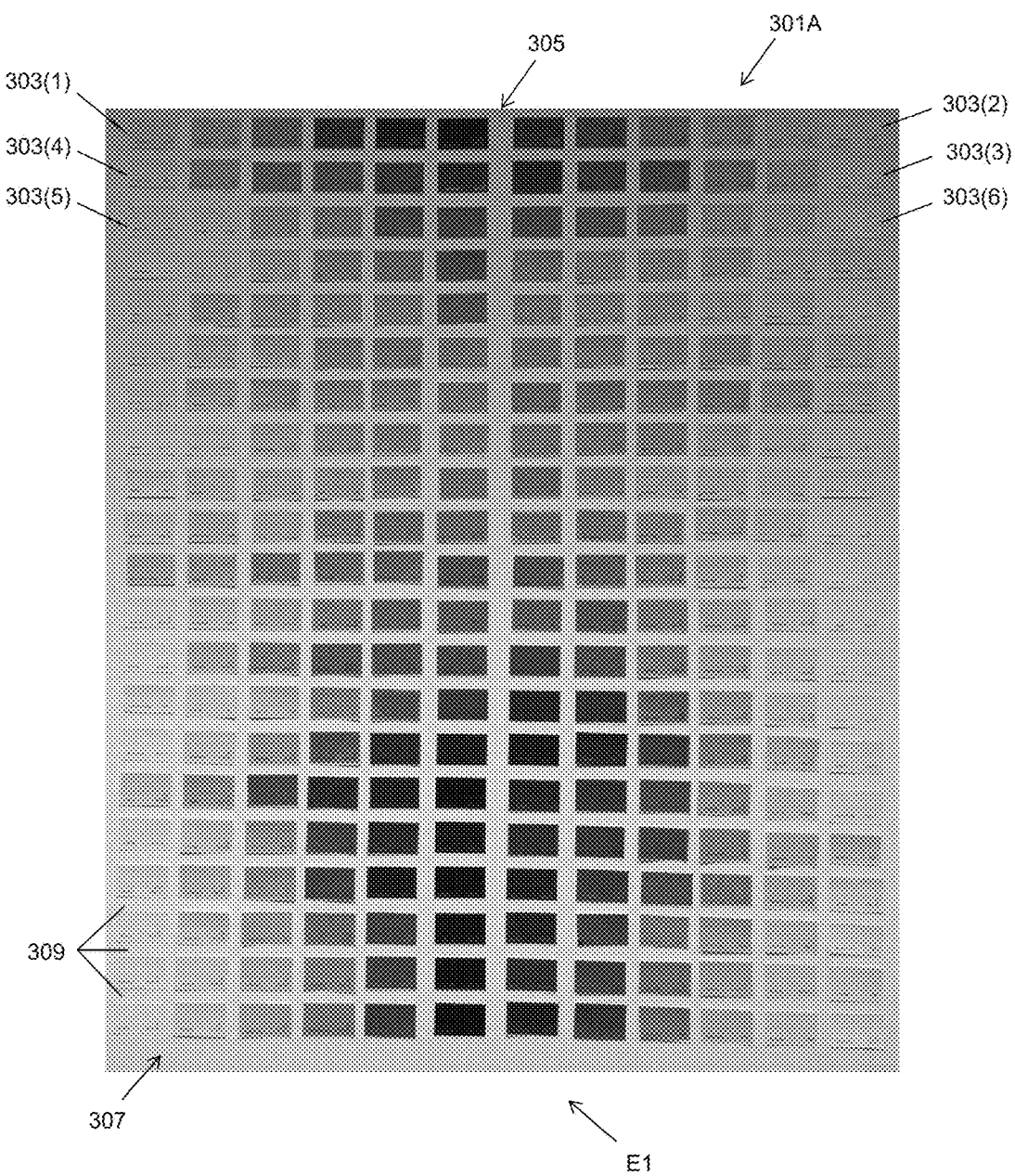
FIGS. 20A-D illustrate novel color displays based on at least one color emotion and arranged in a harmonious manner.

According to one aspect of the present invention, the colors in color group E1 are re-arranged as tangible color chips on a display cabinet for retail stores. The colors in group E1 are arranged around a central axis and columns of colors are transposed or rotated 90° alternately clockwise and counter-clockwise as rows or spokes of colors around this central axis to form display 301A. Referring to FIG. 20A, columns 203(1), 203(2), 203(3), 203(4), etc. from FIG. 2, are transposed to become spokes 303(1), 303(2), 303(3), 303(4), etc. about central axis 305 of substrate 307. It is noted that for convenience, the suffixes (n) of columns 203 and spokes 303 indicate the same or substantially similar groups of colors. As illustrated, any two adjacent columns 203(i), 203(i+1) may form two spokes 303(i), 303(i+1) on the same plane. Colors on spokes 303(i), 303(i+1) are arranged along separators 309 of substrate 307. As shown, separators 309 are connected to or join central axis 305 of substrate 307, and separators 309 form an axis that is transverse to central axis 305. The positions of the spokes 303 on the same plane on either side of central axis 305 can be interchanged. This process is repeated until all the colors in group E1 are transposed to form display 301A.

Preferably, the colors from two spokes 303 located on the same plane have a range of color differences about 15 Delta E ($\Delta E$) units, more preferably 10 $\Delta E$, more preferably 5 $\Delta E$ or 2 $\Delta E$ to ensure that the hues or colors from co-planar spokes are visually similar to each other.

Color difference ($\Delta R$) is defined as the distance between two colors in a color space such as CIELAB (also commonly referred to as L*a*b* or Lab) perceptual color space system developed in 1976 by the Commission Internationale de' L'Eclairage ("CIE") or International Committee on Illumination. The value of $\Delta R$ is calculated using a color difference formula, such as, preferably the CIEDE2000 color difference formula for a 10° standard observer. The CIEDE2000 color difference formula is set forth in G. Sharma, W. Wu, and E. Dalal, "The CIEDE2000 Color-Difference Formula: Implementation Notes, Supplementary Test Data, and Mathematical Observations," *Color Res. Appl.* 30: pp. 21-30, February 2005, which is incorporated herein by reference in its entirety. As noted in the Sharma paper, CIEDE2000 color difference values are calculated by a methodology that transforms measured CIELAB values into CIE L*C*h (lightness, chroma, hue) color space values. The CIEDE2000 color difference equation comprises weighting factors $k_L$, $k_C$, and $k_H$ for the metric lightness difference, metric chroma difference and the metric hue difference, which in the present invention are 1, 1, 1, respectively. Other suitable color difference equations include the CIELUV, CIELAB and the CIE94 color difference equations. As used herein, the color difference $\Delta E$ can be measured in any illuminant. Color difference is further described in commonly owned U.S. Pat. No. 8,330,991 B2, which is incorporated herein by reference in its entirety.

Alternatively, the colors from two spokes located on the same plane have wavelengths within a range of 25 nm in the visible electromagnetic spectrum, more preferably within a range of 20 nm or 15 nm or 10 nm, 7.5 nm or 5 nm range to ensure that the hues or colors from co-planar spokes are visually similar to each other.

As illustrated in FIG. 2, columns 203(n) begin on the right hand side of first color display region 202, which corresponds to the red colors of the visible range of electromagnetic radiation and as the columns progress to the left the hue angles or colors proceed through the oranges, yellows, greens, blues and violets. After the transposition into display 301A, color spokes 303(n) along central axis 305 display a march through the hue angles or colors from reds to purples, and the darker colors are positioned adjacent to central axis 305. As shown in FIG. 20A, the colors of group E1 form a pleasing butterfly or hourglass shape or contour. Alternatively, color spokes 303(n) can be arranged with the darker colors positioned away from central axis 305 to present a different pleasing visual effect. As shown, central axis 305 is the hue axis and spokes 303(n) illustrate the color depth, which as discussed above, is a combination of chroma and lightness variables. As shown, color spokes 303(n) are separated from each other by central axis 305 and by separators 309 on substrate 307.

According to another aspect of the present invention, the number of colors in column 203(n) can be different than the number of colors in spokes 303(n) after the transposition. In one example, each column 203(n), as illustrated in FIGS. 2 and 9-11, comprises seven colors, and each spoke 303, as illustrated in FIGS. 20A-D, comprises six colors. Similarly, 37 columns of colors in FIG. 2 are transposed into 42 spokes, i.e., 21 co-planar pairs. The present inventors have concluded that the number of colors in each spoke and/or the number of spokes can be altered to improve the aesthetics of the display 301 without significantly disrupting the flow or the arrangement of the colors on the display. Preferably, the difference in colors between column 203(n) and spoke 303(n) is one color. In this example, one color from each column is removed before the transposition. The withdrawn colors can be located on the same row shown in FIGS. 2 and 9-11, or can be selected by the designers trained in color theory.

Figure 20B:
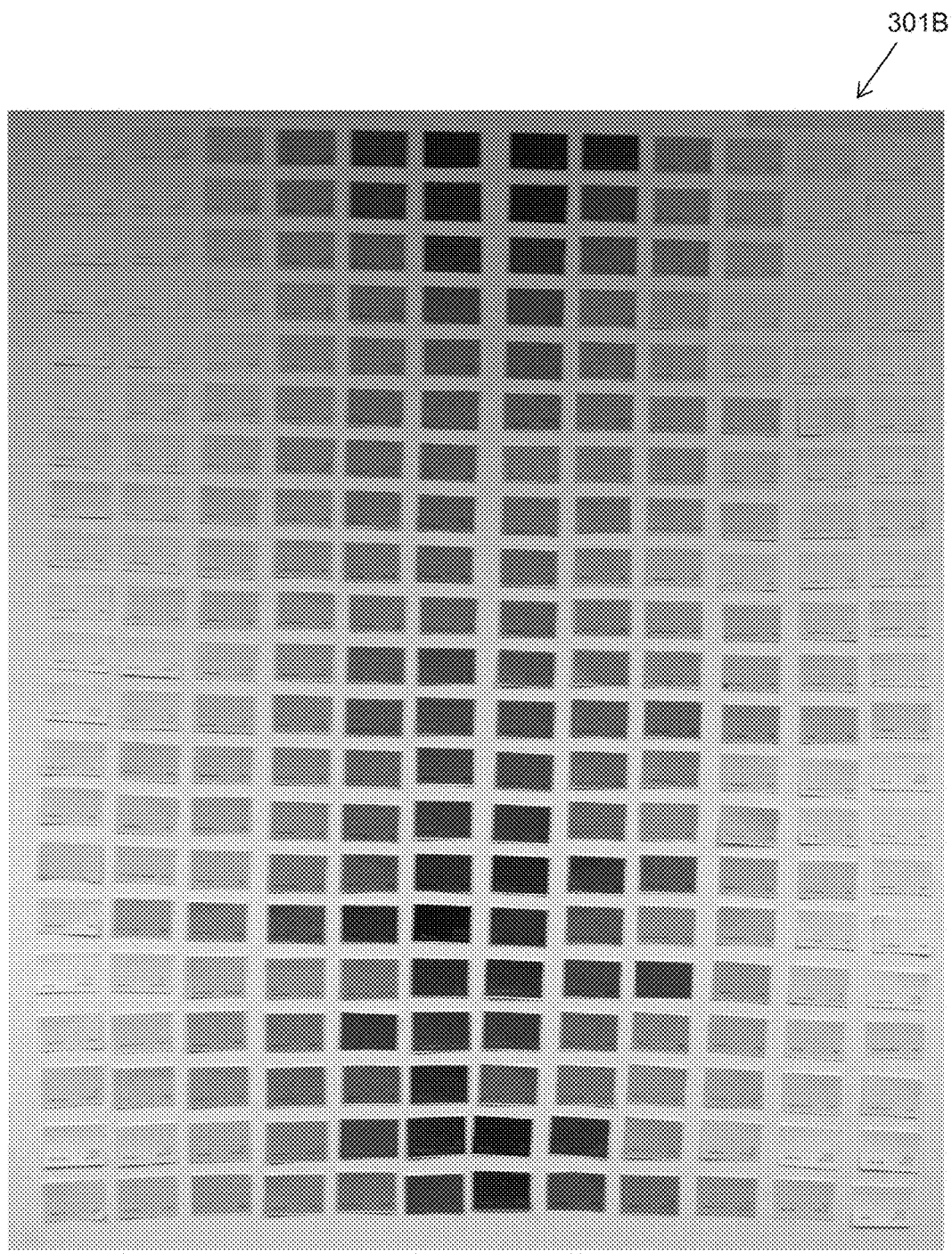
Figure 20C:
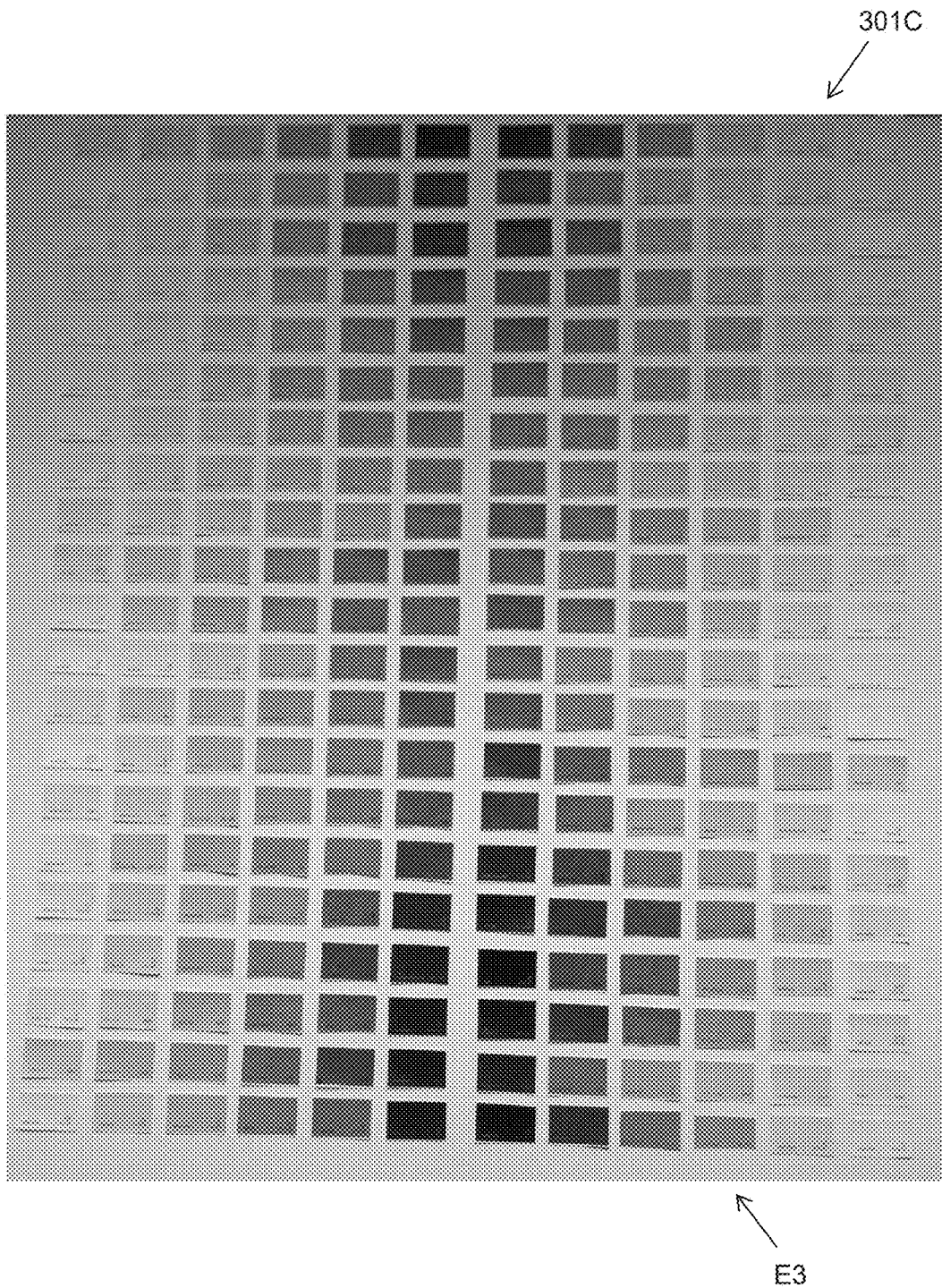
Figure 20D:
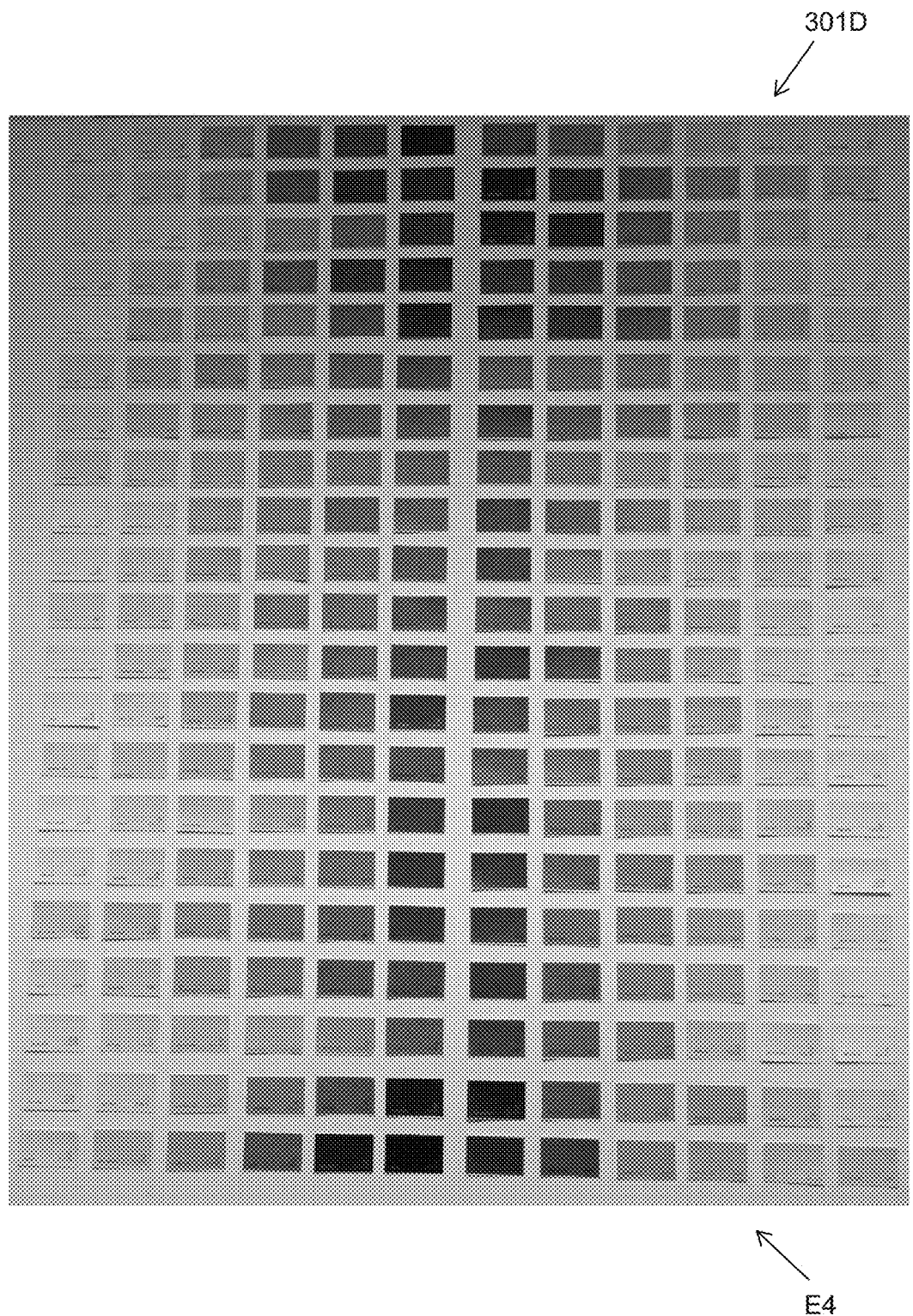
Figure 20E:
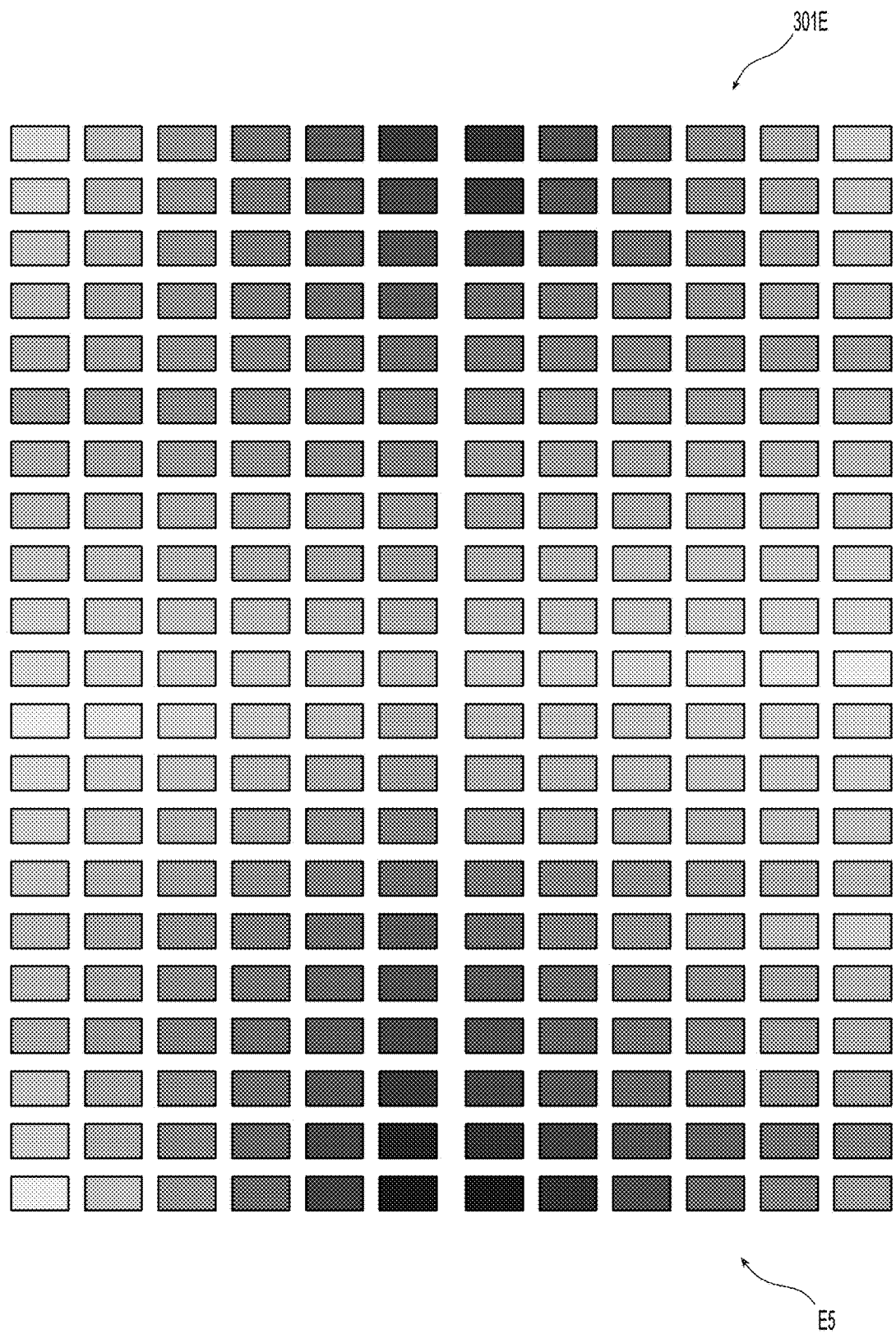
FIG. 20E illustrates a similar display with achromatic colors.

Color groups E2-E4, illustrated in FIGS. 8B-8D and FIGS. 9-11, respectively, are similar arranged as shown in FIGS. 20B-20D, respectively, to form additional color display cabinets 301B-D at retail paint stores. Color groups E1-E4 comprise chromatic colors, discussed above. Additionally, a group of substantially achromatic colors E5 comprising neutral or grey colors can also be arranged in a cabinet display 301E similar to groups E1-E4 and displays 301A-D. The colors in Group E5 preferably comprise a small amount of hue or color in order to differentiate other than by lightness (black and white) alone. Achromatic group E5 are arranged along central hue axis 305 with spokes 303(n) representing color depths with darker colors proximate central hue axis 305, as shown in FIG. 20E. Due to the presence of small amount of hues in substantially achromatic group E5, the hues present a corresponding amount of chroma in the colors in group E5. As discussed above, the colors in group E5 would have an average exciting-calm value based on equation (1) below that of group E4.

Alternatively, achromatic display E5 can be arranged by placing the lights colors, i.e., whites and off-whites together and grouping the darker neutrals separately. Display 301E would have its top half be white/off-white and its bottom half be mid-tones and deep grays. The warmer neutral colors would be on the right side and the cooler neutral colors would be on the left. Alternatively, the warm neutrals or achromatic colors are kept at the top and the cool neutrals or achromatic colors are kept at the bottom. However, the lightest neutrals could be kept together at the top and the darker set of neutrals at the bottom.

Figure 21:
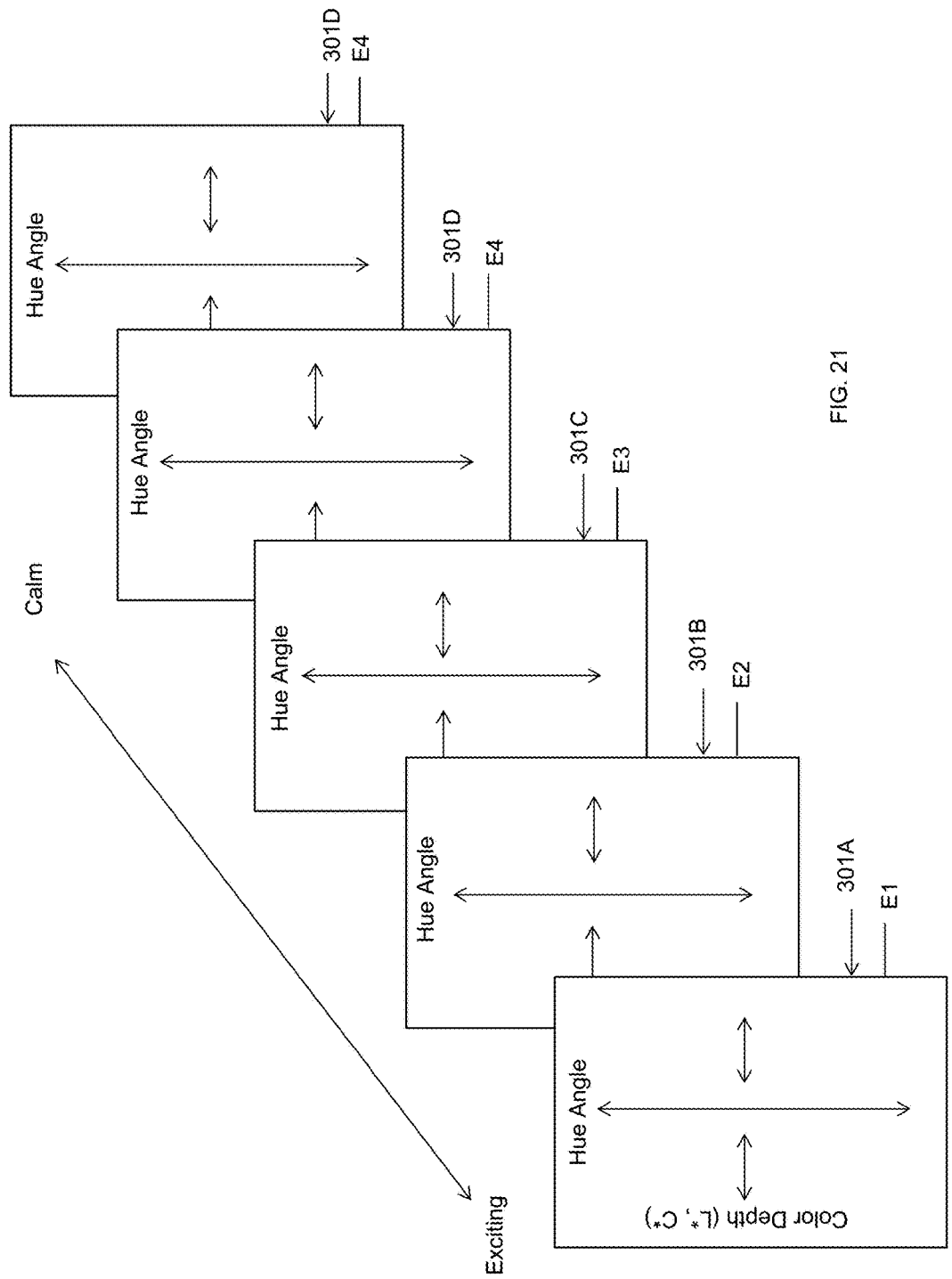
FIG. 21 illustrates a three-dimensional system for arranging colors, where at least one-axis is a color emotion based on psychophysical human responses.

Preferably, displays 301A-E are utilized in the same retail store, and can be arranged as illustrated in FIG. 21. As stated above, any number of displays in the exciting-calm emotion scale can be used, or the exciting-calm emotion scale can be subdivided into any number of displays. For example, the exciting-calm values of the colors in the library can be divided into two displays (E1-E2), three displays (E1-E3), four displays (E1-E4), or into five displays (E1-E5) or incrementally up to and including 10 or more displays (E1-E6 . . . E1-E10). Alternatively, any of the seven color emotions discussed herein can be used instead of the exciting-calm emotion scale to construct displays 301A-#. The total range of color emotion scores or values for each color emotion can similarly be divided into displays 301A-#. Hence, each display 301 would have colors with color emotion scores or values within a specified range, wherein said range is equal to the total range of the color emotion scores for said each color emotion divided by the number of groups or number of displays 301A-#. Alternatively, each display 301 may have a unique average color emotion score.

When multiple displays 301A-# are utilized, a novel three-axis arrangement colors, where one of the axis or stimulus is a color emotion, is realized. As illustrated, the colors are arranged along the central hue angle (central axis 305), a horizontal color depth axis (spokes 303(n)), and a color emotion depth axis (exciting-calming emotion), as illustrated in FIG. 21. Heretofore, none of the known three-dimensional color coordinate systems, including CIEXYZ (1931), CIELAB, CIEL*C*h*, Munsell, OSALjg, MHK/UVW, HuVC, RBG, discussed in commonly owned US patent publication US 2014/0267367, which is incorporated herein by reference in its entirety, has color emotion as one of the axis or one of the variables.

Figure 22:
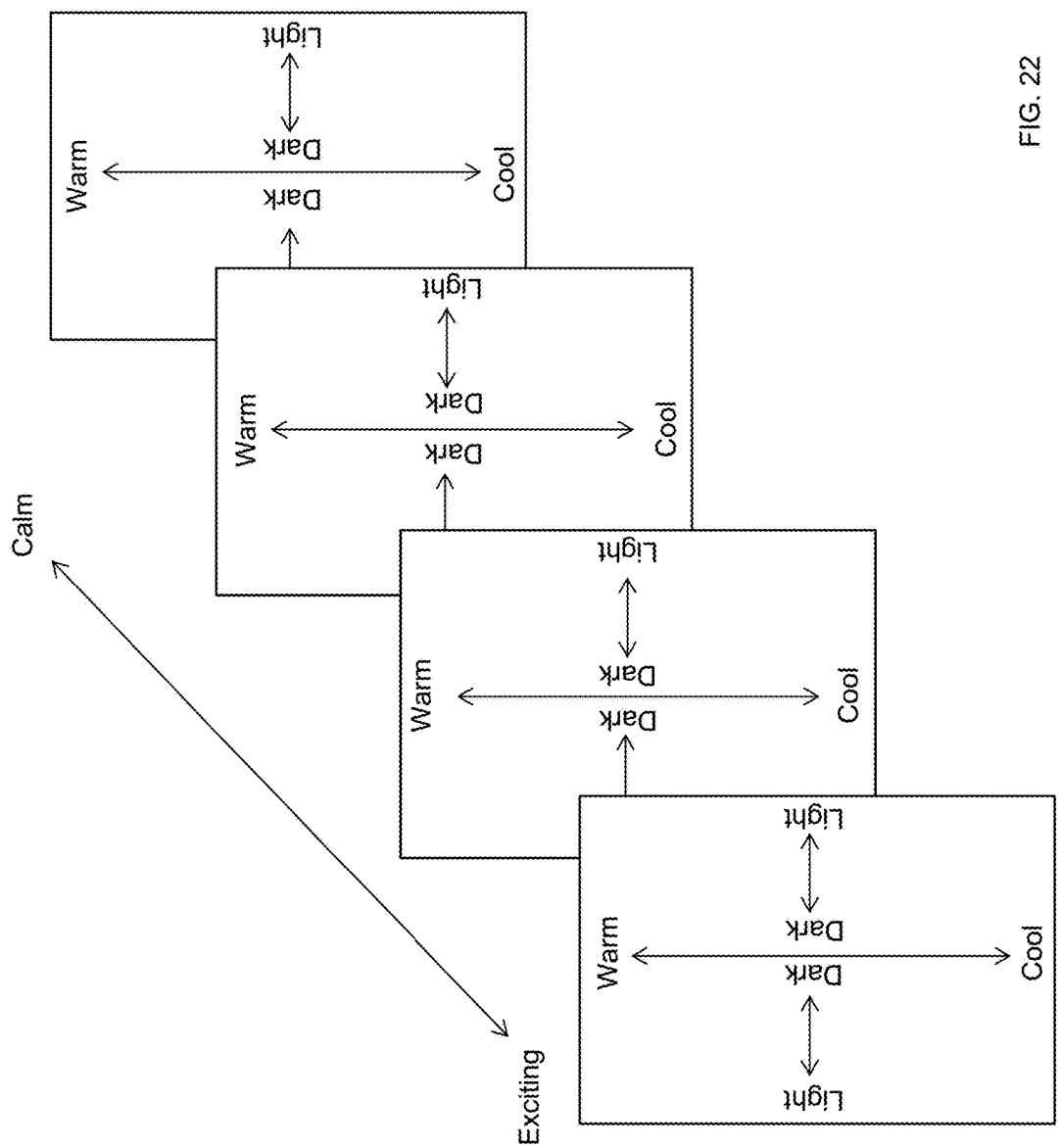
FIG. 22 illustrates another three-dimensional system for arranging colors, where the three axes are exciting/calm, warm/cool and light/heavy color emotions based on psychophysical human responses.

According to another aspect of the present invention, more than one axis of the color coordinate system can be based on color emotions. Referring to FIG. 22, the hue angle vertical axis or central axis 305 has been replaced by the warm-cool color emotion represented by equation (3). While equation (3) is expressed in terms of CIELAB chroma (C*), hue angle ($h_{ab}$) and lightness (L*), the present inventors have determined that the warm-cool emotion can be advantageously substituted for the hue angle axis. Furthermore, the warm-cool emotion can be a more accurate selector of colors under certain circumstances than hue angles, since the warm-cool color emotion equation (3) is expressed in terms of hue, as well as chroma and lightness and is derived from psychophysical reactions of human test subjects. It is noted that reds, oranges and yellows have been considered as warm colors and greens, blues and violets/purples have been considered cool colors.

Additionally, the color depth axis which represents a combination of lightness (L*) and chroma (C*), can be replaced by the light-dark color emotion as expressed by equation (4), which is expressed in terms of CIELAB lightness (L*) modified by certain constants. The present inventors also determined that the light-dark emotion can be used instead of color depth (L*, C*).

Having displays that are based wholly on color emotions or partially on color emotions significantly makes choosing a color palette or more specifically a paint color palette easier. Referring to FIGS. 20A-E, which can be used to illustrate colors arranged in exciting-calming, warm-cool and light-dark emotion color axes, a consumer may choose one emotional level, such as exciting-calming at the E2 values, any colors chosen display 301B would match that emotional value.

In another example, instead of choosing a constant or range of exciting-calming emotional values, the consumer may choose a certain warm-cool emotional value(s), e.g., the third level from the top of central axis 305, then colors from all displays 301A-E at the fourth spokes 303(5) and 303(6) would have similar warm-cool emotional values. If the consumer further wishes to choose a light-dark emotional value(s), for example, at the fourth column from central axis 305, all the fourth colors on spokes 303(5) and 303(6) in displays 301A-E, i.e., third level on the warm-cool scale, would form this palette. Two colors from each display 301A-E, fourth from central axis 305 on spokes 303(5) and 303 (6) would make up this palette of certain warm-cool emotional value(s), certain light-dark emotional value(s), but varying exciting-calming emotional values.

Individualized color palettes that match the consumers' emotional preferences can be identified and gathered without the use of computer software or color wheel theories. The consumers can choose a value or range of values for one color emotion, values or ranges for two color emotions or values or ranges for three color emotions, as discussed above, and create a palette.

Displays 301A-E can also assist consumers to choose colors that are in harmony with each other. As discussed above and in reference to FIGS. 11-12, the colors in E1 have about 88% color harmony score, 80% harmony for group E2, 77% for group E3 and 61% for group E4. However, when the four groups E1-E4 are limited to the top four rows of first color display region 202, the color harmony significantly improved to 94% or group E1, 97% for group E2, and 99% for groups E3 and E4. Hence, color harmony can be assured if the consumers' chosen colors stay within the four outer columns that are on either side of and parallel to central axis 305 as illustrated in FIGS. 20A-D, more preferably within two adjacent columns equidistance from central axis 305 and more preferably within single columns equidistance from central axis 305. Additionally, the color harmony for any color palette can be determined from equations (13)-(15), inter alia, and the members of the color palette can be adjusted to change or improve the color harmony score.

As used herein, colors are harmonious to each other when their color harmony score are at least about 75%, preferably at least about 80%, preferably at least about 85% and more preferably at least 90% or 95%.

Selecting colors that fit the consumers' preferred color emotions and are in harmony with each other based on empirical data and based on psychophysical reactions can be accomplished readily with color displays or cabinets in retail paint stores, preferably without the assistance of computers or software.

In another embodiment of the present invention, displays 301A-E can be constructed independent of any conventional color tristimulus variable, such as hue or lightness or saturation ($L^*$, $C^*$, $h^*$, $a^*$ and $b^*$). In other words, displays 301A-E can be constructed without having to resort to the colors in color groups E1-E5, which have varying exciting-calming emotion but use hue and color depth. Since all the colors in the library on the present invention and all the known colors have tristimulus variables, e.g., $L^*$, $a^*$, $b^*$, $C^*$, $h^*$, etc., multiple color emotions can be generated for each color by using equations (1)-(7). Colors in the library of the present invention, or colors from any library, can be graphed on to a three-color emotion Cartesian coordinate. In the example discussed above, colors can be graphed onto a warm-cool vertical axis, light-dark axis (whether or not symmetrically about vertical axis), and exciting-calming depth axis. The exciting-calming axis or any axis can be subdivided into E1-E# groups and each group can be presented as displays 301A-4, respectively. Alternatively, the light-dark emotion or the exciting-calming emotion can form the vertical axis 305, and the warm-cool emotion or the exciting-calming emotion can form the rows or spokes 303, while the light-dark emotion or warm-cool emotion may form the depth axis.

As mentioned in the preceding paragraph, the light-dark axis (or any other emotional axis) when presented symmetrically about the vertical axis can provide visually pleasing butterfly or hourglass effect, the light-dark axis (or any other emotional axis) can be presented numerical from low to high or high to low. Doing so may remove the symmetrical visual effect, but the color selection process based on the consumers' color emotions remains effective and workable.

Figure 23:
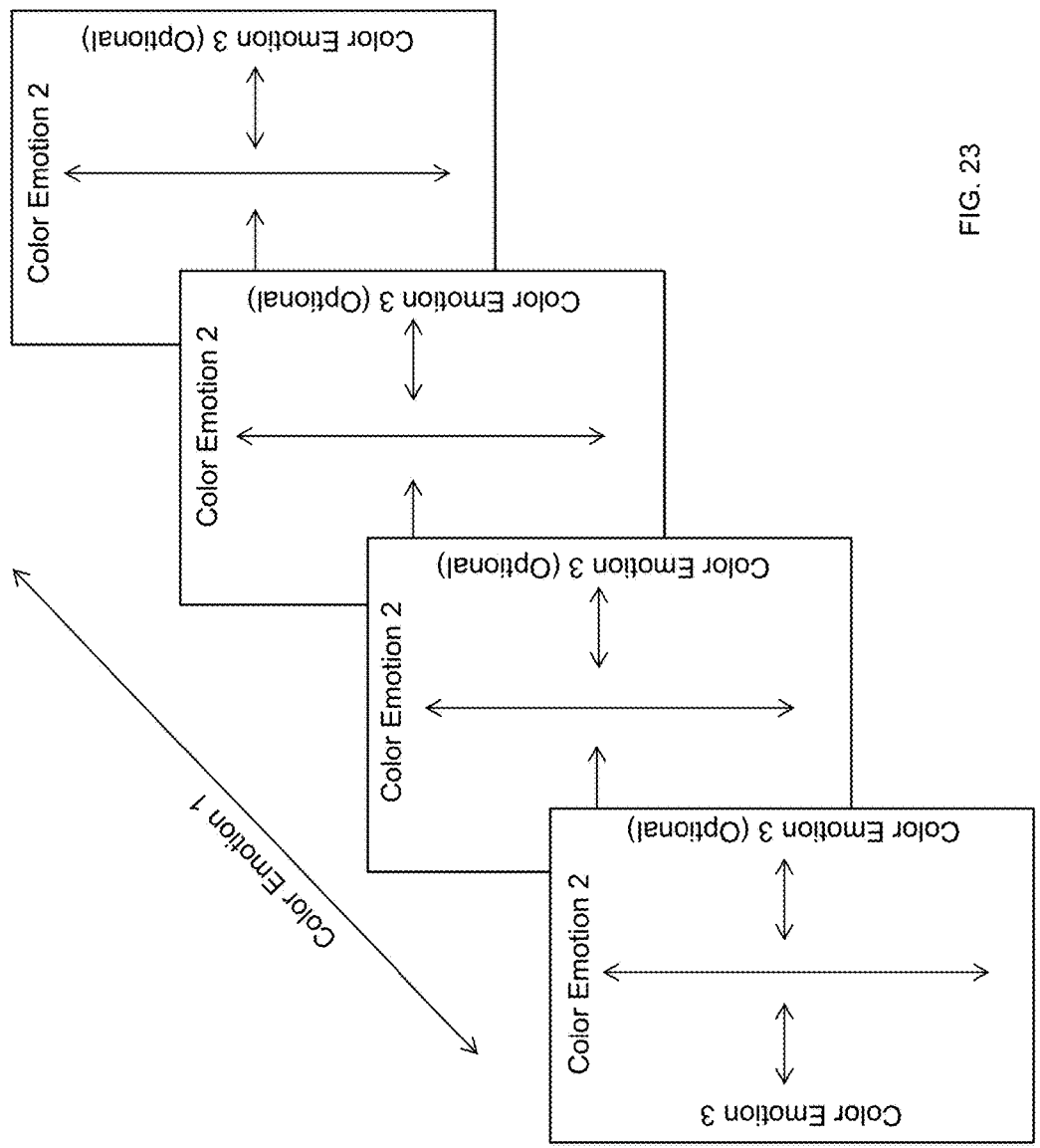
FIG. 23 illustrates another three-dimensional system for arranging colors, where the three axes can be any color emotions based on psychophysical human responses.

FIG. 23 illustrates the present invention more fully. Color emotion coordinates can utilize any three color emotions, including but not limited to the seven color emotions described herein. In one example, the three color emotion Cartesian coordinates may be happy-depressing, fun-serious, and inviting-uninviting (or any other color emotions) arranged in any combination of axes. In this example, preferably color selection device 10 shown in FIG. 1 with controller 38 is employed to re-arrange colors in any three color emotions Cartesian coordinate on demand. A virtual display of colors in three-dimensional color emotion space can be realized. As taught in the parent patent application, one color and one color emotion threshold or value can be used to select a color palette, or at least two color emotion threshold or value can be used to select a color palette. Color selection device 10, which comprises a controller 38, is more than a general purpose computing machine. Color selection device 10 is programmed to execute the particular directions or steps described and claimed herein to select colors for a color palette.

Additionally one or more color emotion can be added as a family of curvilinear surfaces to the illustration of FIG. 23 to create a fourth or fifth dimension. Such techniques have been used in engineering water-steam tables, e.g., http://www.falchemist.com/wordpress/wp-content/uploads/2010/10/Molliere_Small.gif, and can be used here.

In accordance to another aspect of the present invention, a color notation and preferably a numerical color notation associated with color emotions is attached to each color. In the example discussed above with the warm-cool, light-dark and exciting-calming color coordinates or color displays shown in FIG. 22, the color notation may have the following format: WWW-EEE-LL, where WWW is a three-digit number representing the warm-cool emotion, EEE is a three-digit number representing the exciting-calming emotion, and LL is a two-digit number representing the light-dark emotion. It is noted that a number with any number of digits can be used in the color notation, and the order of the numbers representing the color emotions is not limited to WEL (warm-exciting-light). In one embodiment, in order to conform to (or to take advantage of) existing color systems or libraries, such as the Benjamin Moore colors, the LL number can be the last two-digits, i.e., 10-70 and divisible by 10, used in the Benjamin Moore color codes, as shown in the second columns in FIGS. 8A-8D. Color notations are fully disclosed in commonly owned U.S. Pat. No. 8,363,063 entitled "Color Notation System" issued to Ou et al on Jan. 29, 2013.

It is noted by the present inventors that color emotions may have a plurality of uses or applications. For example, color emotions, such as happy, fun and light can be used to change the mood of patients under medical care, and inviting and warm can be used in the hospitality industry and early childhood education. Personal smart phones can display color(s) that reflect the emotions of their users. The present invention is directed to at least the use of applying color emotion(s) to select colors for a color palette. Other methods for selecting colors are known, such as the color wheel and other classical color theories, discussed above, and color experts have selected and continue to select color palettes. The present invention is further directed to another use, i.e., the application of color emotions to create a three-dimensional coordinate system for colors, in addition to the known three-dimensional color coordinate systems discussed in commonly owned US 2014/0267367, which is incorporated by reference in its entirety. The three-dimensional color emotion coordinate system provides a simple way for user and persons untrained in color theories to choose color palettes according to the three axes of this coordinate system. As discussed above, the present invention is also directed to physical color displays or color displays generated by a computer or controller.

Also, as discussed above the present invention also includes the arrangement of colors on a substrate where a first axis of the arrangement can be the hue angle or warm-cool emotion and a second axis can be the color depth or light-dark emotion and where the colors are arranged in substantially symmetrically in the second axis. This arrangement provides an aesthetic appearance, such as a butterfly or hour-glass visual effect. A set of such color arrangements can be utilized with each arrangement in the set comprising colors having a predetermined color emotion or a predetermined color emotion average, wherein this color emotion is preferably exciting-calming.

A number of different features have been described above in respect of various example embodiments. It will be appreciated that a number of the features can be applied across all of the example embodiments even if not expressly stated above. The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for applying psychophysical color emotions to select colors for a color palette comprising the steps of
arranging the colors relative to at least three axes on at least one tangible substrate, wherein the at least three axes comprise a central axis and transverse axis located on the at least one tangible substrate and a third axis, wherein the least one tangible substrate has separators arranged along the transverse axis on both sides of the central axis, wherein the colors are arranged as spokes along the separators and wherein at least one axis of the at least three axes is based on a color emotion;
selecting a group of colors for the color palette based on the positions of the colors relative to at least the central axis and the transverse axis;
wherein said color emotion comprises a bi-polar scale having a plurality of levels between end points and wherein a corresponding first psychophysical equation for said color emotion is derived from psychophysical responses of a plurality of test subjects to a plurality of test colors indicating a degree of color emotion on the bi-polar emotion scale for the plurality of test colors, and said first psychophysical equation for said color emotion determines the color emotion values of the plurality of colors for the arrangement of the plurality of colors on the at least one tangible substrate;
wherein the arranging step is calculated by a processor programmed with said corresponding first psychophysical equation for said color emotion using tristimulus coordinates of the colors.

2. The method according to claim 1, wherein the selecting step comprises the step of keeping a value on one axis substantially constant and vary the values on another axis.

3. The method according to claim 1, wherein the selecting step comprises the step of keeping values on two axes substantially constant and vary the value on another axis.

4. The method according to claim 1, wherein at least two axes are based on color emotions.

5. The method according to claim 1, wherein at least three axes are based on color emotions.

6. The method according to claim 1, wherein the color emotion is selected from a group consisting of exciting-calm, inviting-uninviting, waiin-cool, light-dark, clean-dirty, happy-depressing and fun-serious and combinations thereof.

7. The method of claim 1, wherein the colors from two spokes located on the same plane have a range of color differences of about 15 Delta E ($\Delta E$) units.

8. The method of claim 7, wherein the colors from two spokes located on the same plane have a range of color differences of 10 $\Delta E$.

9. The method of claim 8, wherein the colors from two spokes located on the same plane have a range of color differences of 5 $\Delta E$.

10. The method of claim 9, wherein the colors from two spokes located on the same plane have a range of color differences of 2 $\Delta E$.

11. The method according to claim 1, wherein the at least one tangible substrate comprises a plurality of tangible substrates and the third axis spans across said plurality of tangible substrates.

12. A color display comprising a plurality of colors and a tangible substrate in combination, wherein the substrate has separators on both sides of a central axis and wherein the plurality of colors are arranged as spokes along the separators on both sides of the central axis,
wherein the central axis extends from warm colors to cool colors and wherein each spoke ranges from dark colors to light colors,
wherein the colors from two spokes located on a same plane and across the central axis from each other have substantially similar hue,
wherein the colors on the substrate comprise first color emotion values based on a first psychophysical equation for a first color emotion and wherein the first color emotion values of said colors are within a predetermined range or have a predetermined average,
wherein the first color emotion comprises a bi-polar scale having a plurality of levels between end points and wherein the first psychophysical equation is derived from psychophysical responses of a plurality of test subjects to a plurality of test colors indicating a degree of color emotion on the bi-polar emotion scale for the plurality of test colors, and said first psychophysical equation for said first color emotion determines the color emotion values of the plurality of colors for the arrangement of the plurality of colors on the substrate, and wherein the color emotion values are calculated by a processor programmed with said first psychophysical equation for said color emotion using tristimulus coordinates of the colors.

13. The color display of claim 12, wherein each spoke ranges from dark colors proximate to the central axis to light colors away from the central axis.

14. The color display of claim 12, wherein the warm colors and cool colors are based on a warm-cool psychophysical equation.

15. The color display of claim 12, wherein the dark colors and light colors are based on a dark-light psychophysical equation.

16. The color display of claim 12, wherein colors arranged on same position away from the central axis on the spokes are harmonious to each other.

17. The color display of claim 12, wherein colors located on a same column parallel to the central axis are harmonious to each other.

18. The color display of claim 12, wherein the colors located on two adjacent columns parallel to the central axis are harmonious to each other.

19. The color display of claim 12, wherein the substrate forms a surface of a cabinet.

20. The color display of claim 12, wherein the substrate comprises a computer screen.

21. The color display of claim 12, wherein the first color emotion value is an exciting-calming color emotion.

22. A set of color displays comprising a plurality of the color displays of claim 12, wherein the plurality of colors in each of said color displays have a unique predetermined average of first color emotion values.

23. The color display of claim 12, wherein the colors from two spokes located on the same plane have a range of color differences of about 15 Delta E ($\Delta E$) units.

24. The color display of claim 23, wherein the colors from two spokes located on the same plane have a range of color differences of 10 $\Delta E$.

25. The color display of claim 24, wherein the colors from two spokes located on the same plane have a range of color differences of 5 $\Delta E$.

26. The color display of claim 25, wherein the colors from two spokes located on the same plane have a range of color differences of 2 $\Delta E$.

* * * * *